(12) United States Patent
Gagnon et al.

(10) Patent No.: US 11,327,052 B2
(45) Date of Patent: May 10, 2022

(54) ULTRASONIC INSPECTION PROBE, SYSTEM, AND METHOD

(71) Applicant: The Boeing Company, Chicago, IL (US)

(72) Inventors: Roy M. Gagnon, San Antonio, TX (US); Jeffry J. Garvey, San Clemente, CA (US); James C. Kennedy, Port Angeles, WA (US)

(73) Assignee: The Boeing Company, Chicago, IL (US)

( * ) Notice: Subject to any disclaimer, the term of this patent is extended or adjusted under 35 U.S.C. 154(b) by 261 days.

(21) Appl. No.: 16/554,426

(22) Filed: Aug. 28, 2019

(65) Prior Publication Data

US 2021/0063355 A1    Mar. 4, 2021

(51) Int. Cl.
*G01N 29/24* (2006.01)
*G01N 29/28* (2006.01)

(52) U.S. Cl.
CPC ............. *G01N 29/24* (2013.01); *G01N 29/28* (2013.01)

(58) Field of Classification Search
CPC ...... G01N 29/24; G01N 29/28; G01N 29/265; G01N 29/223; G01N 29/262; G01N 2291/023; G01N 2291/2638; G01N 2291/106; G01N 2291/0289
USPC .......................................................... 73/632
See application file for complete search history.

(56) References Cited

U.S. PATENT DOCUMENTS

| | | | |
|---|---|---|---|
| 4,195,530 A | 4/1980 | Abramczyk et al. | |
| 4,612,809 A * | 9/1986 | Cribbs | G01N 29/262 600/437 |
| 8,087,298 B1 * | 1/2012 | DiMambro | G01N 29/226 73/629 |
| 9,127,971 B2 | 9/2015 | Sarr et al. | |
| 2009/0316531 A1 * | 12/2009 | Brignac | G01N 29/2462 367/178 |
| 2013/0150725 A1 * | 6/2013 | Choi | A61B 8/4281 600/472 |
| 2014/0095085 A1 | 4/2014 | Fetzer et al. | |
| 2017/0059531 A1 * | 3/2017 | Fetzer | G01N 29/265 |

(Continued)

FOREIGN PATENT DOCUMENTS

| | | |
|---|---|---|
| EP | 2138837 | 12/2009 |
| EP | 2720037 | 4/2014 |
| EP | 2864772 | 4/2015 |

(Continued)

OTHER PUBLICATIONS

Extended European Search Report for European Patent Application No. 20192922.1 dated Jan. 28, 2021.

*Primary Examiner* — Tarun Sinha
(74) *Attorney, Agent, or Firm* — Kunzler Bean & Adamson

(57) ABSTRACT

Disclosed herein is an ultrasonic inspection probe for inspecting parts. The ultrasonic inspection probe comprises a probe body that comprises an ultrasonic array and a plate attachment surface. The ultrasonic array comprises a plurality of ultrasound elements, each selectively operable to generate an ultrasonic beam and each fixed relative to the plate attachment surface. The ultrasonic inspection probe also comprises an interface plate, comprising a body attachment surface, removably attachable to the plate attachment surface of the probe body, and a part inspection surface, shaped to complement a shape of one of the parts.

20 Claims, 16 Drawing Sheets

(56) References Cited

U.S. PATENT DOCUMENTS

2017/0328869 A1\* 11/2017 Miki ................... G01N 29/223
2018/0284072 A1\* 10/2018 Pfortje ................ G01N 29/225

FOREIGN PATENT DOCUMENTS

EP         3136093        3/2017
EP         3477298        5/2019

\* cited by examiner

United States Patent 11,327,052 B2

ULTRASONIC INSPECTION PROBE, SYSTEM, AND METHOD

FIELD

This disclosure relates generally to the non-destructive testing of parts, and more particularly to an ultrasonic inspection probe for the non-destructive testing of parts.

BACKGROUND

Non-destructive testing of parts using ultrasonic testing techniques includes penetrating the parts with ultrasonic beams and detecting the behavior of the ultrasonic beams upon existing the parts. Under certain circumstances, to properly penetrate the parts with ultrasonic beams, the tool for generating the ultrasonic beams rides along the surface of part being tested. Accordingly, the tool is calibrated and re-calibrated based on the shapes of the parts being tested. Accurately calibrating conventional tools to conform to different shapes of parts being tested is difficult and time consuming.

SUMMARY

The subject matter of the present application provides examples of an ultrasonic inspection system, ultrasonic inspection probe, and method of inspecting parts that overcome the above-discussed shortcomings of prior art techniques. The subject matter of the present application has been developed in response to the present state of the art, and in particular, in response to shortcomings of conventional ultrasonic testing systems and methods.

Disclosed herein is an ultrasonic inspection probe for inspecting parts. The ultrasonic inspection probe comprises a probe body, comprising an ultrasonic array and a plate attachment surface. The ultrasonic array comprises a plurality of ultrasound elements, each selectively operable to generate an ultrasonic beam and each fixed relative to the plate attachment surface. The ultrasonic inspection probe also comprises an interface plate, comprising a body attachment surface, removably attachable to the plate attachment surface of the probe body, and a part inspection surface, shaped to complement a shape of one of the parts. The preceding subject matter of this paragraph characterizes example 1 of the present disclosure.

When the body attachment surface of the interface plate is removably attached to the plate attachment surface of the probe body, each ultrasonic beam generated by the plurality of ultrasound elements is substantially normal to the part inspection surface at an intersection of each ultrasonic beam and the part inspection surface. The preceding subject matter of this paragraph characterizes example 2 of the present disclosure, wherein example 2 also includes the subject matter according to example 1, above.

The plurality of ultrasound elements of the ultrasonic array is arranged in a first circular arc having a first radius. The preceding subject matter of this paragraph characterizes example 3 of the present disclosure, wherein example 3 also includes the subject matter according to any one of examples 1-2, above.

The part inspection surface defines a second circular arc having a second radius. The second radius is smaller than the first radius. The first circular arc and the second circular arc are substantially concentric when the body attachment surface of the interface plate is removably attached to the plate attachment surface of the probe body. The preceding subject matter of this paragraph characterizes example 4 of the present disclosure, wherein example 4 also includes the subject matter according to example 3, above.

The interface plate is removably attached to the probe body by at least one fastener. The preceding subject matter of this paragraph characterizes example 5 of the present disclosure, wherein example 5 also includes the subject matter according to any one of examples 1-4, above.

The probe body further comprises a first fluid supply line. The interface plate further comprises a second fluid supply line. The second fluid supply line is fluidly coupleable with the first fluid supply line when the body attachment surface of the interface plate is removably attached to the plate attachment surface of the probe body. The interface plate further comprises a fluid reservoir pocket formed in the body attachment surface. The second fluid supply line is fluidly coupleable with the fluid reservoir pocket. The preceding subject matter of this paragraph characterizes example 6 of the present disclosure, wherein example 6 also includes the subject matter according to any one of examples 1-5, above.

The interface plate further comprises a plurality of second fluid supply lines. Each one of the plurality of second fluid supply lines is fluidly coupleable with the first fluid supply line when the body attachment surface of the interface plate is removably attached to the plate attachment surface of the probe body. Each one of the plurality of second fluid supply lines is fluidly coupleable with the fluid reservoir pocket. The preceding subject matter of this paragraph characterizes example 7 of the present disclosure, wherein example 7 also includes the subject matter according to example 6, above.

The interface plate comprises at least two part inspection surfaces, spaced apart from each other, and the ultrasonic array is interposed between the at least two part inspection surfaces. The preceding subject matter of this paragraph characterizes example 8 of the present disclosure, wherein example 8 also includes the subject matter according to example 1, above.

The plurality of ultrasound elements of the ultrasonic array is arranged in a circular arc. The shape of one of the parts comprises an inside radius. The at least two part inspection surfaces are configured such that, when the at least two part inspection surfaces engage the one of the parts, the inside radius is substantially concentric with the circular arc of the plurality of ultrasound elements. The preceding subject matter of this paragraph characterizes example 9 of the present disclosure, wherein example 9 also includes the subject matter according to example 8, above.

The probe body further comprises at least two plate attachment surfaces, spaced apart from each other. The interface plate further comprises at least two body attachment surfaces, spaced apart from each other. Each one of the at least two body attachment surfaces of the interface plate is removably attachable to a corresponding one of the at least two plate attachment surfaces of the probe body. The preceding subject matter of this paragraph characterizes example 10 of the present disclosure, wherein example 10 also includes the subject matter according to any one of examples 8 or 9, above.

The interface plate is removably attached to the probe body by only one fastener. The preceding subject matter of this paragraph characterizes example 11 of the present disclosure, wherein example 11 also includes the subject matter according to example 10, above.

The part inspection surface of the interface plate is non-adjustable. The preceding subject matter of this paragraph characterizes example 12 of the present disclosure, wherein example 12 also includes the subject matter according to any one of examples 1-11, above.

The ultrasonic inspection probe further comprises a plurality of interface plates. Each one of the parts is shaped differently than any other one of the parts. The plurality of interface plates is interchangeably removably attachable to the probe body. The part inspection surface of each one of the plurality of interface plates is shaped differently than the part inspection surface of any other one of the plurality of interface plates to complement the shape of a corresponding one of the parts. The preceding subject matter of this paragraph characterizes example 13 of the present disclosure, wherein example 13 also includes the subject matter according to any one of examples 1-12, above.

The plurality of ultrasound elements of the ultrasonic array is arranged in a first circular arc having a first radius. The part inspection surface of each one of the plurality of interface plates defines a second circular arc. A second radius of the second circular arc of the part inspection surface of each one of the plurality of interface plates is smaller than the first radius and is different than the second radius of the second circular arc of the part inspection surface of any other one of the plurality of interface plates. The first circular arc and the second circular arc of the part inspection surface of any one of the plurality of interface plates when the body attachment surface of the corresponding one of the plurality of interface plates is removably attached to the plate attachment surface of the probe body. The preceding subject matter of this paragraph characterizes example 14 of the present disclosure, wherein example 14 also includes the subject matter according to example 13, above.

When the body attachment surface of any one of the plurality of interface plates is removably attached to the plate attachment surface of the probe body, each ultrasonic beam generated by the plurality of ultrasound elements is substantially normal to the part inspection surface of the corresponding one of the plurality of interface plates at an intersection of each ultrasonic beam and the part inspection surface. The preceding subject matter of this paragraph characterizes example 15 of the present disclosure, wherein example 15 also includes the subject matter according to example 14, above.

Each one of the plurality of interface plates comprises at least two part inspection surfaces, spaced apart from each other. The plurality of ultrasound elements of the ultrasonic array is arranged in a circular arc. Each one of the parts comprises an inside radius and is shaped differently than any other of the parts. When the at least two part inspection surfaces of any one of the plurality of interface plates, when removably attached to the probe body, engage a corresponding one of the parts, the inside radius of the corresponding one of the parts is substantially concentric with the circular arc of the plurality of ultrasound elements. The at least two part inspection surfaces of any one of the plurality of interface plates is configured differently than the at least two inspection surfaces of any other one of the plurality of interface plates. The preceding subject matter of this paragraph characterizes example 16 of the present disclosure, wherein example 16 also includes the subject matter according to example 13, above.

Further disclosed herein is an ultrasonic inspection system for inspecting parts. The ultrasonic inspection system comprises a robot and an end effector, coupled to and movable by the robot. The end effector comprises a compliance interface assembly, directly coupled to the robot and an ultrasonic inspection probe, coupled to the compliance interface assembly such that the compliance interface assembly couples the ultrasonic inspection probe to the robot. The ultrasonic inspection probe comprises a probe body, comprising an ultrasonic array and a plate attachment surface. The ultrasonic array comprises a plurality of ultrasound elements, each selectively operable to generate an ultrasonic beam and each fixed relative to the plate attachment surface. The ultrasonic array also comprises an interface plate, comprising a body attachment surface, removably attachable to the plate attachment surface of the probe body, and a part inspection surface, shaped to complement a shape of one of the parts. The preceding subject matter of this paragraph characterizes example 17 of the present disclosure.

Additionally disclosed herein is a method of inspecting parts. The method comprises removably attaching a first interface plate to a probe body. The method also comprises riding a first part inspection surface of the first interface plate along a first one of the parts. The method further comprises, while riding the part inspection surface of the interface plate along the first one of the parts, directing ultrasonic beams, generated from an ultrasonic array of the probe body and fixed relative to the probe body, toward the first one of the parts. The preceding subject matter of this paragraph characterizes example 18 of the present disclosure.

The method further comprises removing the first interface plate from the probe body. The method also comprises removably attaching a second interface plate to the probe body in place of the first interface plate. The method additionally comprises riding a second part inspection surface of the second interface plate along a second one of the parts. The second one of the parts is shaped differently than the first one of the parts. The method further comprises while riding the part inspection surface of the second interface plate along the second one of the parts, directing ultrasonic beams, generated from the ultrasonic array of the probe body, toward the second one of the parts. The preceding subject matter of this paragraph characterizes example 19 of the present disclosure, wherein example 19 also includes the subject matter according to example 18, above.

The step of removably attaching the first interface plate to the probe body comprises tightening at least one fastener. The step of removing the first interface plate from the probe body comprises loosening the at least one fastener. The step of removably attaching the second interface plate to the probe body in place of the first interface plate comprises tightening the at least one fastener. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein is an ultrasonic inspection system for inspecting parts and a corresponding method. The ultrasonic inspection system includes an ultrasonic inspection tool that helps inspect multiple, differently-shaped, parts, using the same ultrasonic inspection tool. More specifically, by using a common probe body and multiple differently-shaped interface plates that are interchangeably removably attachable to the common probe body, multiple, differently-shaped, parts can be inspected without swapping out the entire ultrasonic inspection tool. Because the common probe body houses the ultrasonic array necessary for ultrasonic inspection, the interface plates can be more inexpensively made and manufactured. Additionally, the interface plates can be exchanged easier and quicker compared to swapping out an entire ultrasonic inspection tool for another. Accordingly, the present ultrasonic inspection system and method of inspecting parts disclosed herein provides a more inexpensive, efficient, and simple alternative to conventional ultrasonic testers and testing methods.

Figure 1:
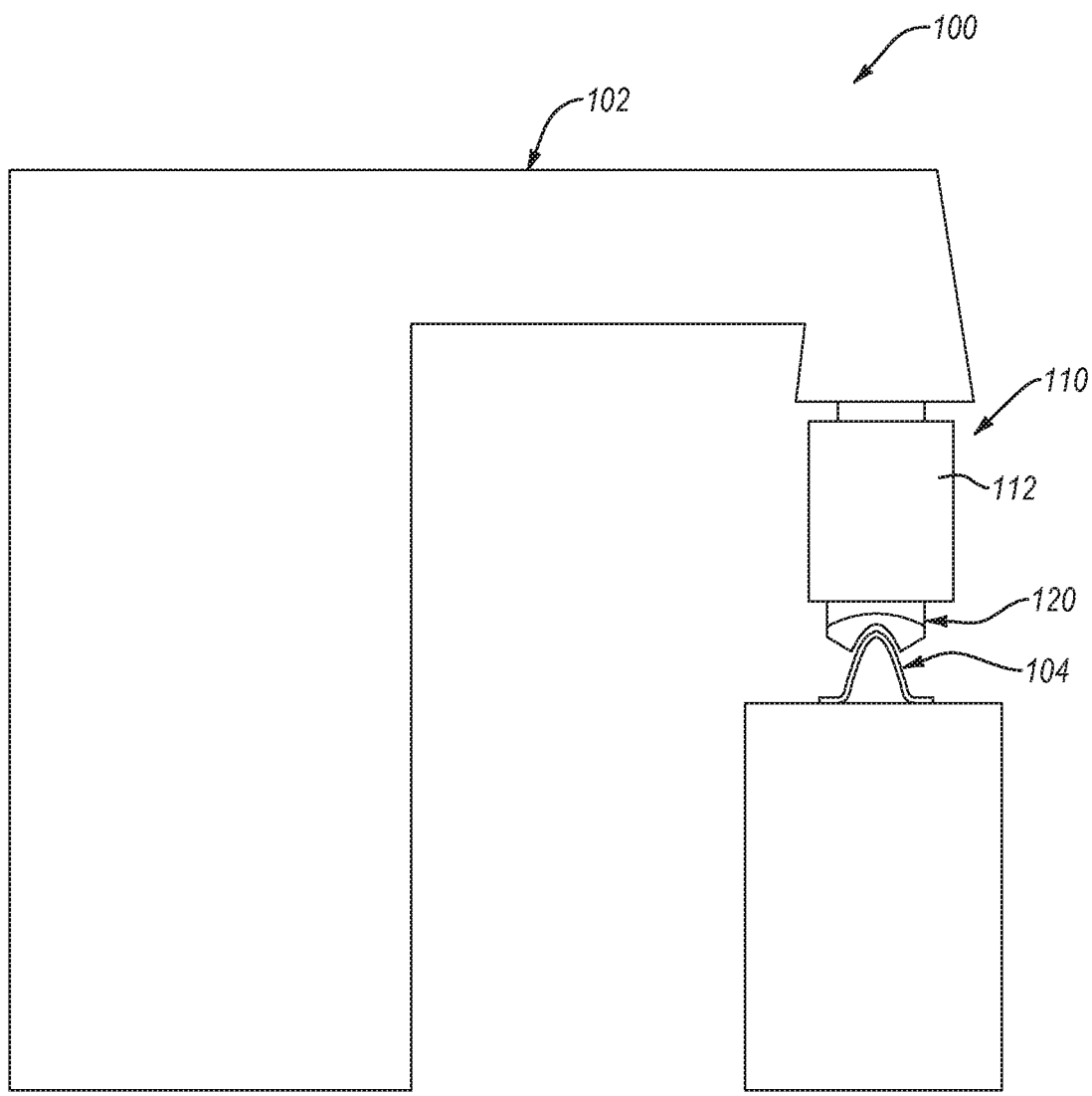
FIG. 1 is a schematic side view of an ultrasonic inspection system for inspecting parts, according to one or more examples of the present disclosure.

Referring to FIG. 1, according to some examples, disclosed herein is an ultrasonic inspection system 100 for inspecting parts 104 using ultrasonic beams. The ultrasonic inspection system 100 includes a robot 102 and an end effector 110. The robot 102 is an industrial robot that is automated, programmable, and capable of movement on three or more axis. The end effector 110 is coupled to and movable by the robot 102. In certain examples, the end effector 110 is removably (e.g., releasably) coupled to the robot 102. The end effector 110 includes an ultrasonic inspection probe 120 operable to generate ultrasonic beams. The end effector 110 additionally includes a compliance interface assembly 112. The ultrasonic inspection probe 120 is coupled to the robot 102 via the compliance interface assembly 112. The robot 102 is operable to move the end effector 110 relative to a part 104 being inspected such that, while the ultrasonic inspection probe 120 generates the ultrasonic beams, the ultrasonic inspection probe 120 rides along an exterior surface of the part 104 being inspected. As the ultrasonic inspection probe 120 rides along the exterior surface of the part 104, the compliance interface assembly 112 is configured to provide compliance (e.g., flex or cushioning) for the ultrasonic inspection probe 120 and movement of the ultrasonic inspection probe 120 relative to the robot 102 in appropriate directions. For example, the compliance interface assembly 112 may include one or more springs to allow the ultrasonic inspection probe 120 to accommodate variations in the surface of the part 104 being inspected and a gimbal mechanism to allow the ultrasonic inspection probe 120 to swivel as the ultrasonic inspection probe 120 moves along undulations in the surface of the part 104 being inspected.

According to certain examples, as shown in FIGS. 2-8, the ultrasonic inspection probe 120 includes a probe body 122 and an interface plate 124. In general, the ultrasonic inspection probe 120 is configured to inspect parts with an externally radiused surface, such as a rounded stiffener having an outside radius 109. The interface plate 124 is removably attachable to the probe body 122. In FIGS. 2, 4, and 6-8, the interface plate 124 is removably attached to the probe body 122. The probe body 122 is directly attached to the compliance interface assembly 112. In some examples, the probe body 122 is directly attached to the compliance interface assembly 112 in a substantially permanent, non-removable, manner. In other words, attaching the probe body 122 to and removing the probe body 122 from the compliance interface assembly 112 is more labor intensive and more complex than attaching the interface plate 124 to and removing the interface plate 124 from the probe body 122. For this reason, for testing different parts each having a different shape, the ultrasonic inspection system 100 utilizes replacement of just the interface plate 124 rather than the entire ultrasonic inspection probe 120 or the entire end effector 110.

The probe body 122 includes a plate attachment surface 140 and the interface plate 124 includes a body attachment surface 141. The body attachment surface 141 is removably attachable to the plate attachment surface 140 to form an attachment interface 126 therebetween. In other words, the plate attachment surface 140 of the probe body 122 and the body attachment surface 141 of the interface plate 124 are configured to mate with each other to form the attachment interface 126. Accordingly, a shape of the plate attachment surface 140 complements the shape of the body attachment surface 141. In one example, the body attachment surface 141 of the interface plate 124 is configured to nestably engage the plate attachment surface 140 of the probe body 122. In a certain example, the body attachment surface 141 seats flush against the plate attachment surface 140 when the interface plate 124 is removably attached to the probe body 122. The plate attachment surface 140 and the body attachment surface 141 can have any of various shapes. In the illustrated example, the plate attachment surface 140 is a concave surface with a circular arc shape and the body attachment surface 141 is a convex surface with a circular arc shape. The concavity of the plate attachment surface 140 of the probe body 122 facilitates placement of an arc-shaped ultrasonic array 150 within the probe body 122. However, in alternative examples, the plate attachment surface 140 and the body attachment surface 141 have a non-circular arc shape, have a non-flat non-arc shape, or are flat.

Figure 3:
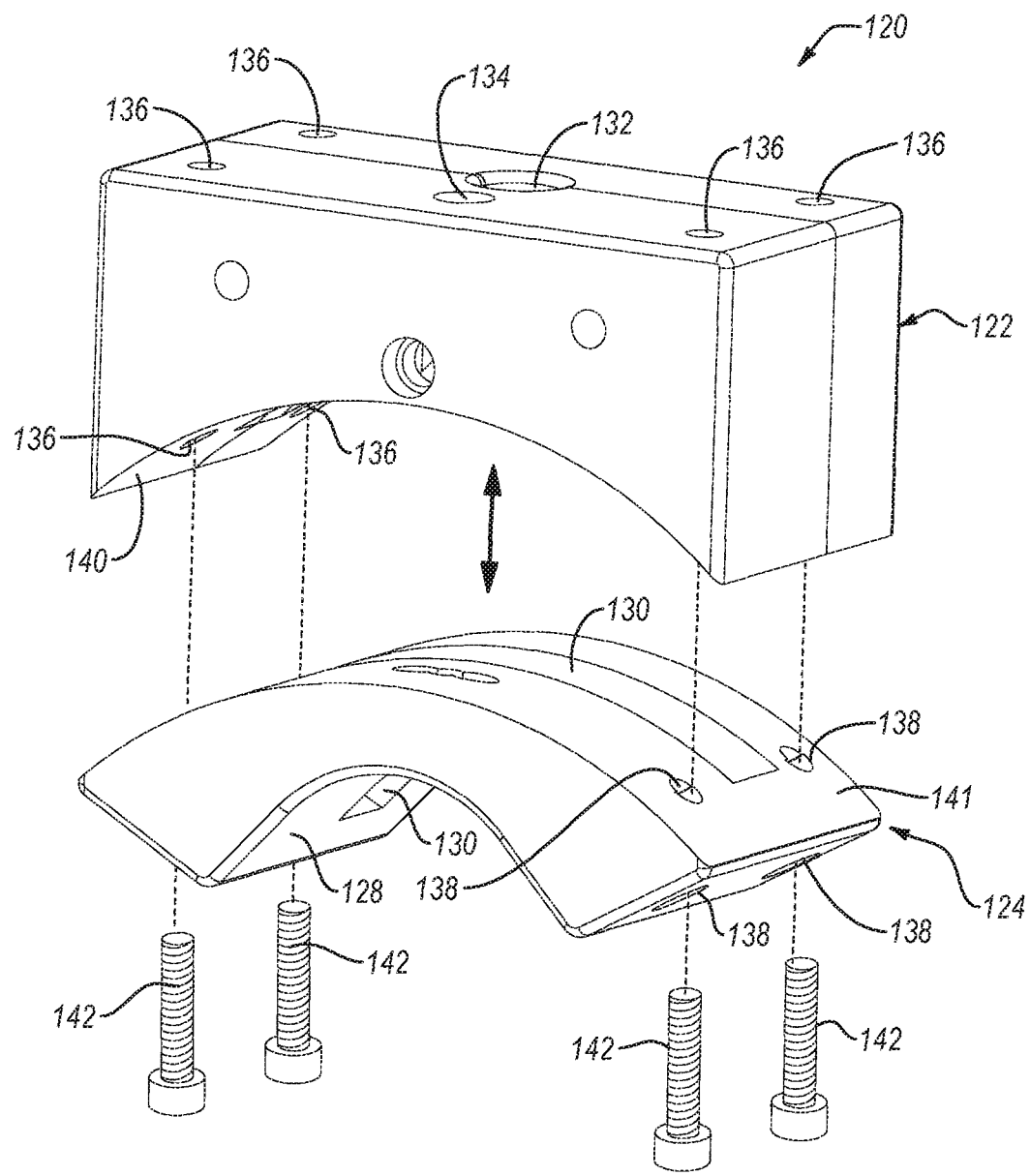
FIG. 3 is an exploded first perspective view of the ultrasonic inspection probe of FIG. 2, according to one or more examples of the present disclosure.
Figure 4:
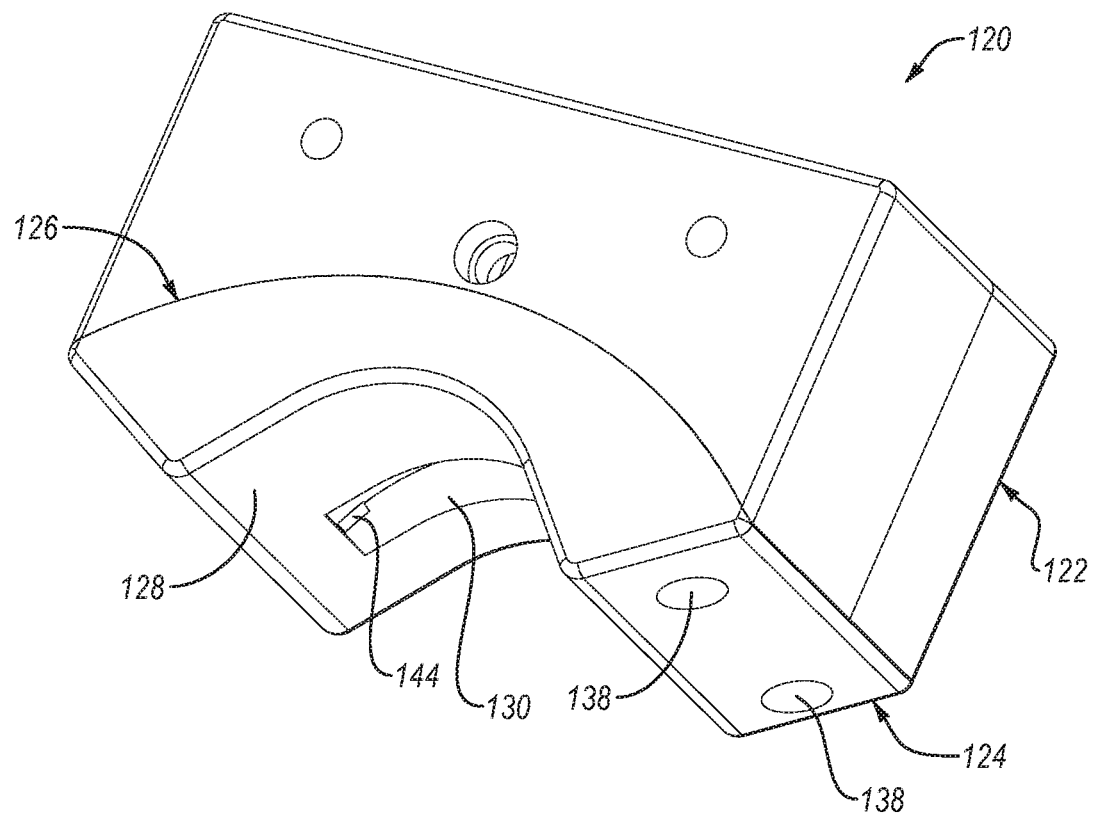
FIG. 4 is a second perspective view of the ultrasonic inspection probe of FIG. 2, according to one or more examples of the present disclosure.
Figure 5:
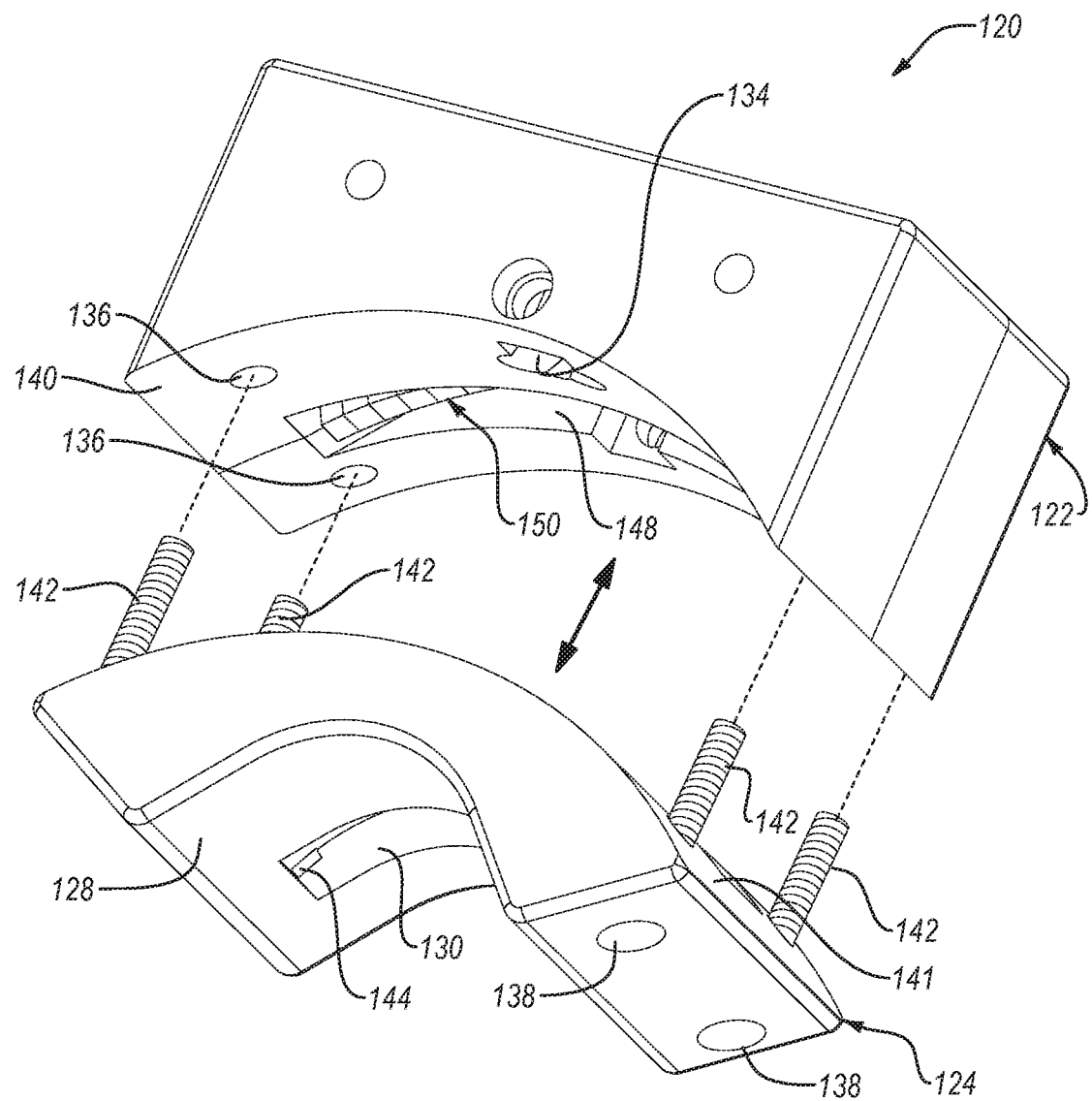
FIG. 5 is an exploded second perspective view of the ultrasonic inspection probe of FIG. 2, according to one or more examples of the present disclosure.
Figure 6:
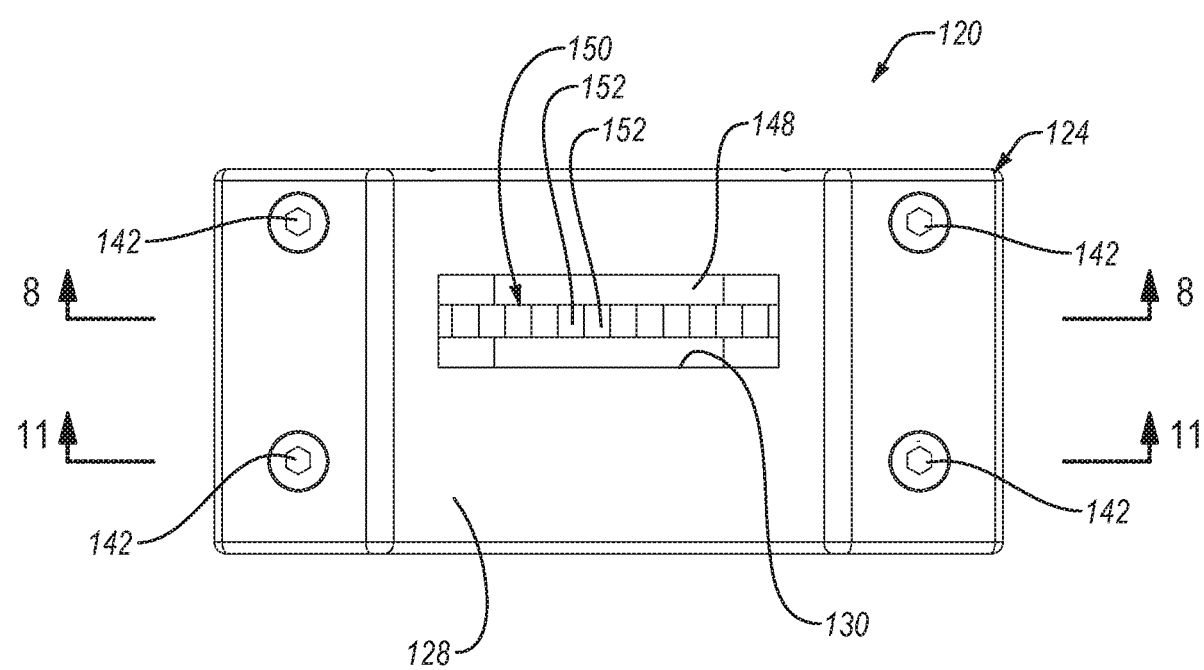
FIG. 6 is a bottom view of the ultrasonic inspection probe of FIG. 2, according to one or more examples of the present disclosure.
Figure 7:
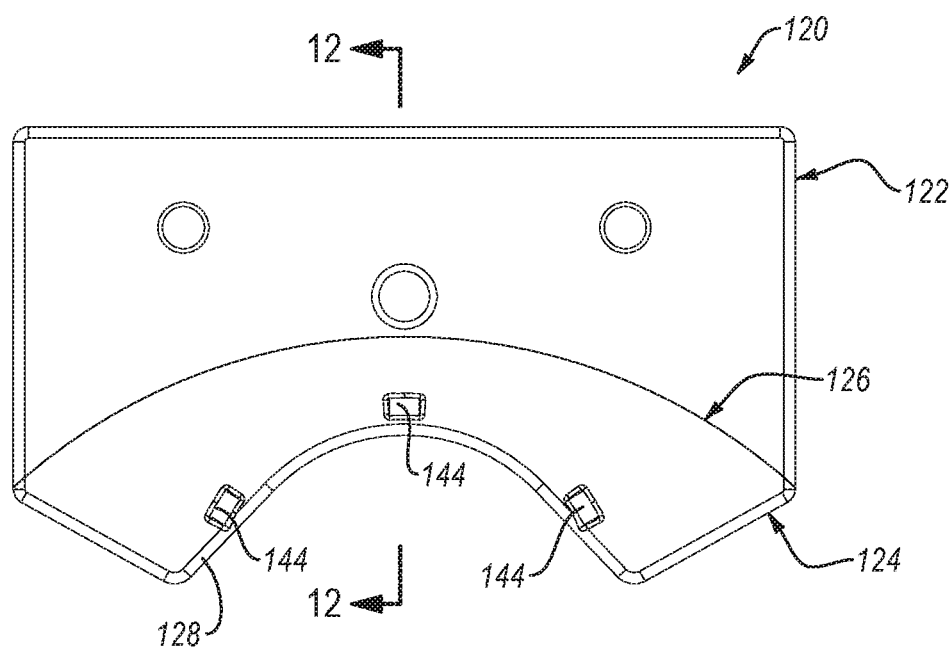
FIG. 7 is a front view of the ultrasonic inspection probe of FIG. 2, according to one or more examples of the present disclosure.

Removable attachment of the body attachment surface 141 to the plate attachment surface 140 is facilitated by one or more fasteners 142 in some examples. As shown in FIGS. 3 and 5, in one example, the ultrasonic inspection probe 120 includes multiple fasteners 142 (e.g., four fasteners 142). The fasteners 142 are configured to extend through aligned holes in the probe body 122 and the interface plate 124. More specifically, in the illustrated example, the probe body 122 includes holes 136 open to the plate attachment surface 140 and the interface plate 124 includes holes 138 extending entirely through the interface plate 124 and open to the body attachment surface 141. Either the holes 136 or the holes 138 include internal threads for engaging external threads of the fasteners 142. When the plate attachment surface 140 is mated to the body attachment surface 141, each one of the holes 136 in the probe body 122 is aligned with a corresponding one of the holes 138 in the interface plate 124. When aligned, a corresponding one of the fasteners 142 is extendable into the aligned holes to engage the threads of the threaded hole. In the illustrated example, the holes 136 of the probe body 122 include threads to engage the threads of the fasteners 142 after the fastener passes through the holes 138 of the interface plate 124. Threadable engagement between the fasteners 142 and the threads of the holes 136 allow the fasteners 142 to be tightened to attach the interface plate 124 to the probe body 122 or be loosened to remove the interface plate 124 from the probe body 122. Although fasteners are utilized in the illustrated example, in other examples, other coupling devices, such as quick-releases, resilient clips/tabs, interference-fitted components, etc., that facilitate removable attachment of the interface plate 124 to the probe body 122 can be used.

The probe body 122 includes and houses an ultrasonic array 150 (see, e.g., FIGS. 5, 6, 8, and 9). The ultrasonic array 150 is non-movably fixed to the probe body 122 and includes a plurality of ultrasound elements 152. In one example, each ultrasonic element 152 is operable to generate an ultrasonic beam 162. The collection of ultrasonic beams 162 generated by the ultrasound elements 152 of the ultrasonic array 150 define an ultrasonic field 160. In some examples, the ultrasound elements 152 are arranged in a side-by-side manner, such that one ultrasound element 152 is directly adjacent at least one other ultrasound element 152.

The ultrasound elements 152 are arranged relative to each other into a particularly shaped formation to define a shape of the ultrasonic array 150. The shape of the ultrasonic array 150 depends on the desired directionality of the ultrasonic beams 162 generated by the ultrasound elements 152 of the ultrasonic array 150 (see, e.g., FIG. 9). Moreover, the directionality of a given ultrasonic beam 162 depends on the orientation of the ultrasonic element 152 that generated the ultrasonic beam 162. In the illustrated example, the ultrasound elements 152 are arranged into a circular arc having a first radius r1. In other words, the ultrasonic array 150 has a circular-arc shape. The ultrasound elements 152, being arranged in a circular arc, generate ultrasonic beams 162 that pass through the center 164 of the circular arc. In other words, every ultrasonic beam 162 generated by the ultrasonic array 150 passes through the center of the circular arc defined by the ultrasonic array 150.

Referring to FIGS. 5, 6, 8, and 9, the probe body 122 includes a body internal cavity 148. The ultrasonic array 150 is fixedly positioned within the body internal cavity 148. Accordingly, the body internal cavity 148 is shaped to fit the ultrasonic array 150 in the body internal cavity 148. The body internal cavity 148 is open at the plate attachment surface 140.

Figure 2:
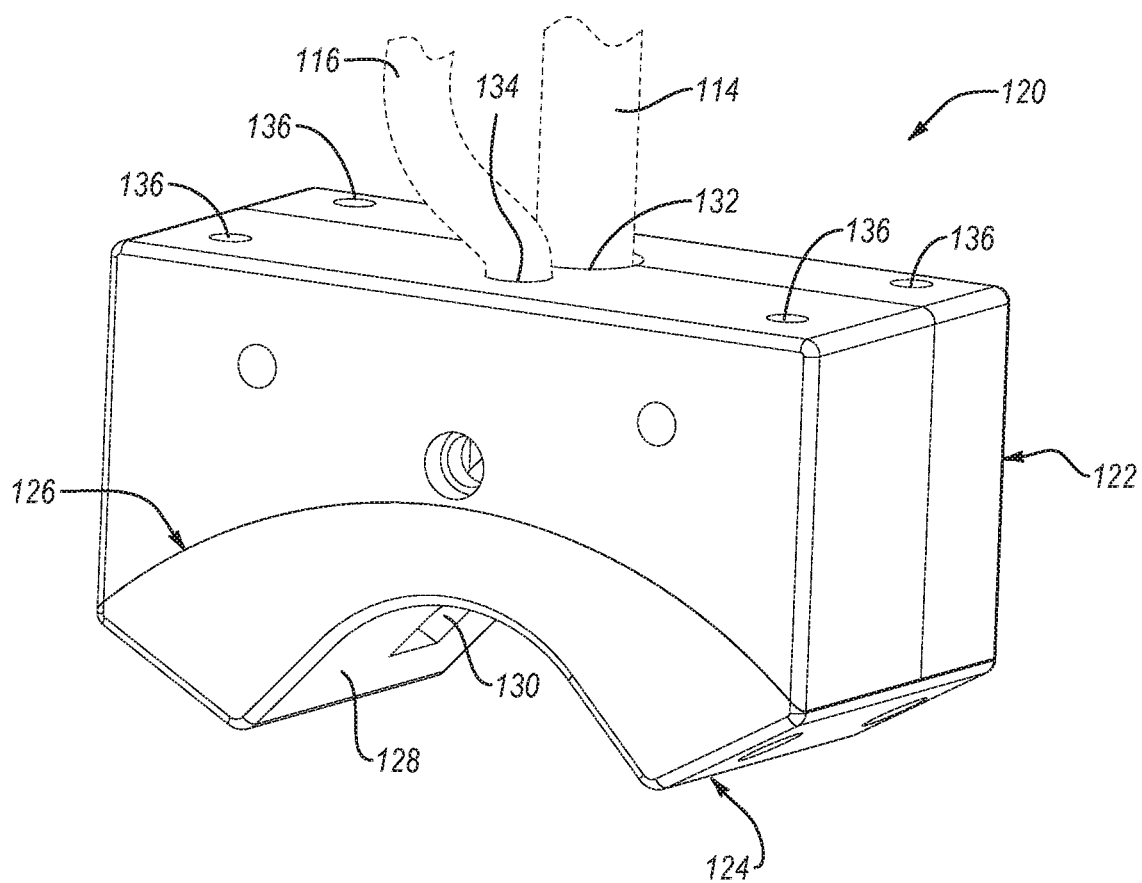
FIG. 2 is a first perspective view of an ultrasonic inspection probe, such as can be used with the ultrasonic inspection system of FIG. 1, according to one or more examples of the present disclosure.

The probe body 122 additionally includes an aperture 132 open to the body internal cavity 148. As shown in FIG. 2, the aperture 132 allows a power-communications line 114 to be coupled to the ultrasonic array 150. The power-communications line 114 extends through the aperture 132 from a location external to the probe body 122 (e.g., at a controller of the ultrasonic inspection system 100), through the aperture 132, and into power and/or communications coupling engagement with the ultrasonic array 150.

Figure 11:
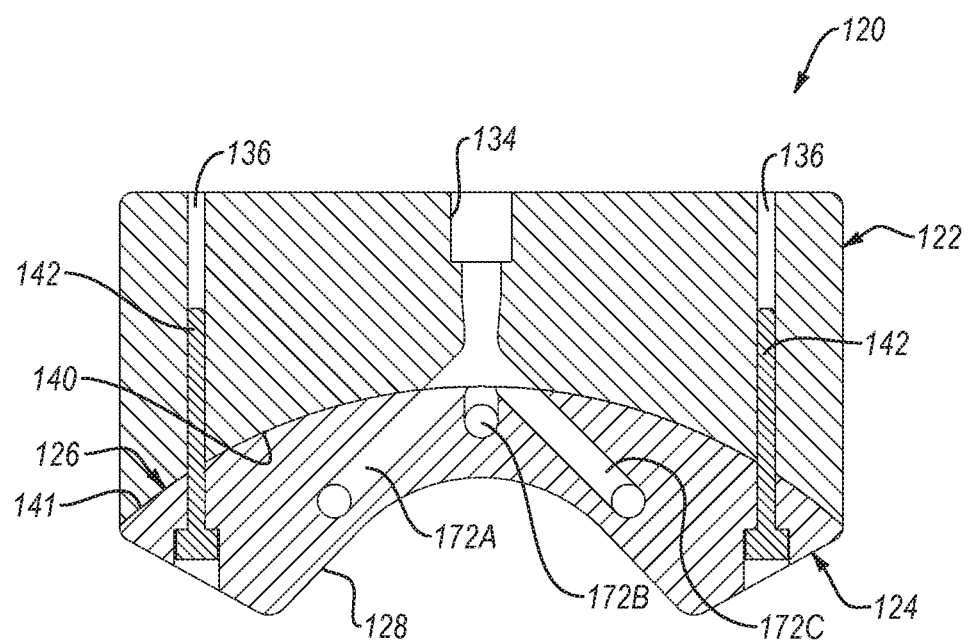
FIG. 11 is a cross-sectional front view of the ultrasonic inspection probe of FIG. 2, taken along the line 11-11 of FIG. 6, according to one or more examples of the present disclosure.

With further reference to FIG. 2, the probe body 122 also includes a first fluid supply line 134 formed in the probe body 122. As shown in FIG. 11, the first fluid supply line 134 extends through the probe body 122. The first fluid supply line 134 is configured to receive fluid from a fluid source line 116, which can be fluidly coupled to a fluid source external to the probe body 122. The fluid source supplies a coupling fluid to the first supply line 134 via the fluid source line 116. The coupling fluid is configured to provide a fluid medium between the ultrasonic array 150 and a surface of the part 104 being inspected, which helps propagate the ultrasonic beams 162 from the ultrasonic array 150 to the surface of the part 104.

Figure 8:
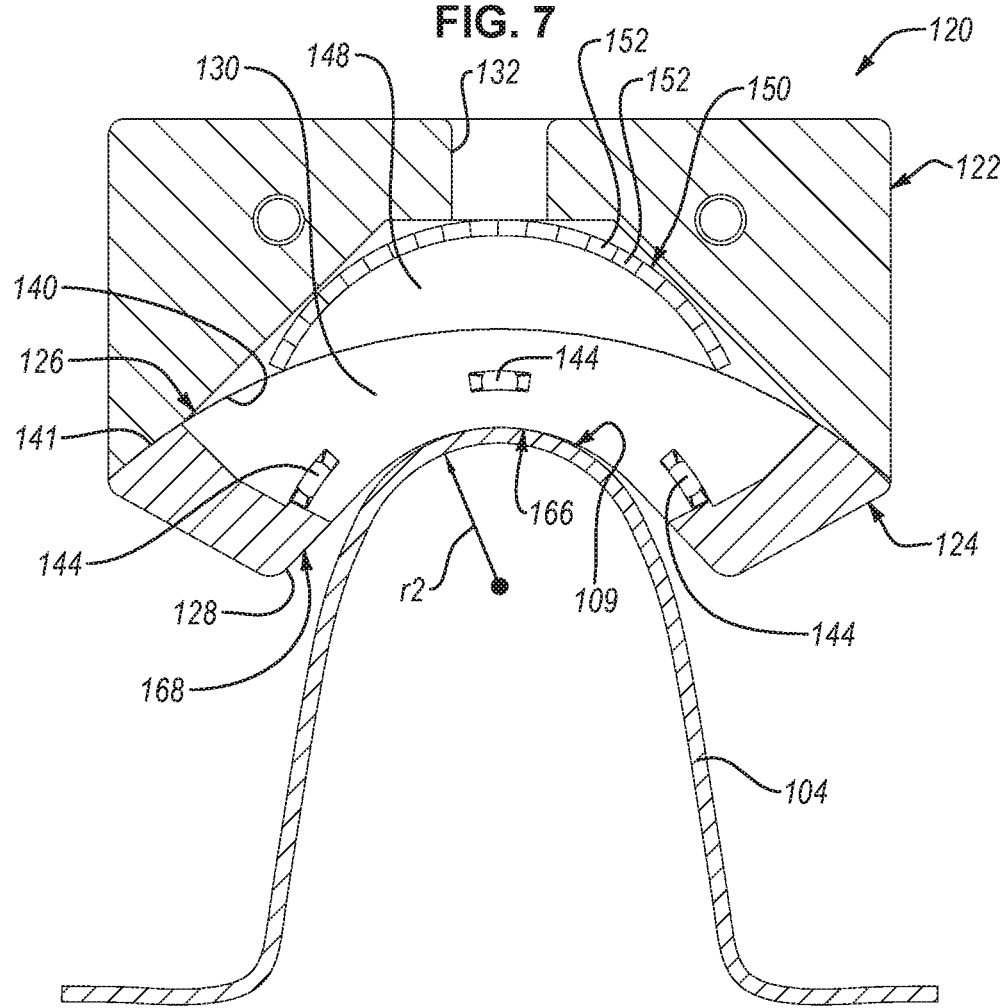
FIG. 8 is a cross-sectional front view of the ultrasonic inspection probe of FIG. 2, taken along the line 8-8 of FIG. 6, according to one or more examples of the present disclosure.
Figure 9:
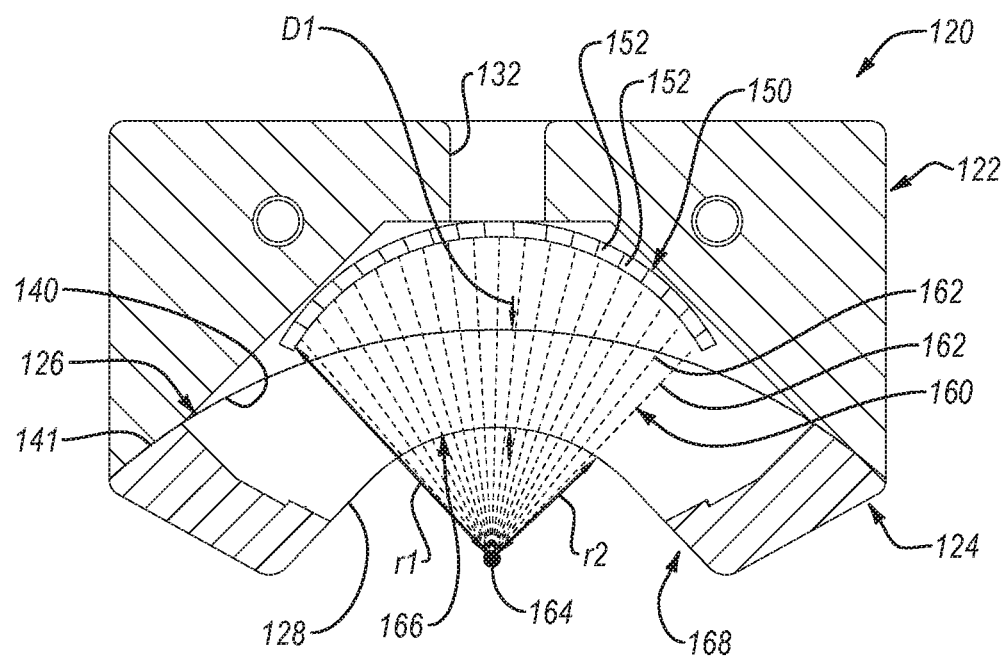
FIG. 9 is another cross-sectional front view of the ultrasonic inspection probe of FIG. 2, taken along the line 8-8 of FIG. 6, according to one or more examples of the present disclosure.

As shown in FIGS. 3-9, the interface plate 124 further includes a part inspection surface 128 on an opposite side of the interface plate 124 as the body attachment surface 141. The part inspection surface 128 is fixed or is non-adjustable. Accordingly, the shape of the part inspection surface 128 is not flexible and cannot be changed in certain examples. The part inspection surface 128 is shaped to complement a shape of the part 104 being inspected. In other words, at least a portion of the part inspection surface 128 has substantially the same shape as the surface of the part 104 being inspected. In this manner, the part inspection surface 128 is able to ride along the surface of the part 104 being inspected with little to no offset between the part inspection surface 128 and the surface of the part 104. According to one example shown in FIG. 8, the part 104 includes a convex circular-arc shaped external surface, having a second radius r2, along which the part inspection surface 128 rides while inspecting the part 104. Accordingly, the part inspection surface 128 has a part-riding portion 166 with a concave circular-arc shape having the second radius r2. In some examples, as shown in FIGS. 8 and 9, the part inspection surface 128 may include clearance portions 168 that flank the part-riding portion 166. The clearance portions 168 do not have the same shape as the part 104. Instead, the clearance portions 168 are shaped to allow the ultrasonic inspection probe 120 to avoid interference with the part 104 as the ultrasonic inspection probe 120 is moved into riding position on the part 104.

The part 104 shown in FIG. 8 is a hat stringer. However, the part 104 can be any of various parts having a similar convex circular-arc shaped external surface along which the part inspection surface 128 rides as the part 104 is inspected by the ultrasonic inspection probe 120.

Figure 12:
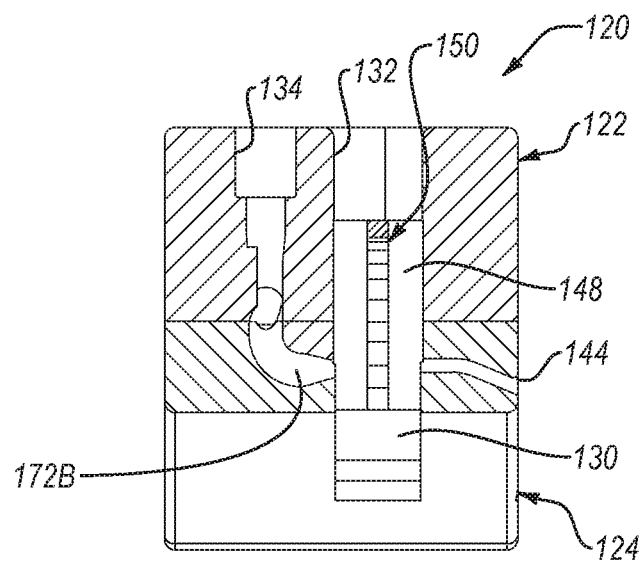
FIG. 12 is a cross-sectional side view of the ultrasonic inspection probe of FIG. 2, taken along the line 12-12 of FIG. 7, according to one or more examples of the present disclosure.

Referring to FIGS. 3-6 and 8, the interface plate 124 additionally includes a fluid reservoir pocket 130 formed in and open to both the body attachment surface 141 and the part inspection surface 128. In other words, the fluid reservoir pocket 130 extends from the body attachment surface 141 to the part inspection surface 128. When the interface plate 124 and the probe body 122 are removably attached, the fluid reservoir pocket 130 is open to the body internal cavity 148. As shown in FIGS. 11 and 12, the interface plate 124 also includes at least one second fluid supply line (e.g., second fluid supply lines 172A-C) open to the fluid reservoir pocket 130. In the illustrated example, the interface plate 124 includes three second fluid supply lines 172A-C. Each one of the three second fluid supply lines 172A-C is open to the fluid supply line 134 of the probe body 122 when the probe body 122 and the interface plate 124 are removably attached. Accordingly, fluid supplied to the fluid supply line 134 flows into the second fluid supply lines 172A-C and subsequently into the fluid reservoir pocket 130 and the body internal cavity 148. The second fluid supply lines 172A-C are separated and spaced apart from each other such that fluid flowing from them into the fluid reservoir pocket 130 enters the fluid reservoir pocket 130 at spaced apart locations, thus promoting uniform filling of the fluid in the fluid reservoir pocket 130. To allow fluid to flow into and out of the fluid reservoir pocket 130 during an inspection procedure, the interface plate 124 also includes one or more exit ports 144 (see, e.g., FIGS. 7 and 12) extending from the fluid reservoir pocket 130 to outside the interface plate 124.

Now referring to FIG. 9, in some examples, the second radius r2 of the part-riding portion 166 of the part inspection surface 128 is less than the first radius r1 of the ultrasonic array 150. Moreover, a top-center location of the part inspection surface 128 of the interface plate 124 is a distance D1 away from a top-center location of the body attachment surface 141 of the interface plate 124. The distance D1 is selected such that, when the interface plate 124 is removably attached to the probe body 122, the ultrasonic array 150 is concentric or substantially concentric with the part-riding portion 166 of the part inspection surface 128 of the interface plate 124. In other words, the circular arc defined by the ultrasonic array 150 and the circular arc of the part inspection surface 128 share or substantially share the same center 164, from which the radii of the ultrasonic array 150 and the part inspection surface 128 are defined. As used herein, two circular arcs are substantially concentric when a normal drawn from the first arc is substantially normal to the second arc.

Because the ultrasonic array 150 is concentric or substantially concentric with the part-riding portion 166 of the part inspection surface 128 of the interface plate 124 and the ultrasonic beams 162 generated by the ultrasonic array 150 pass through the shared center 164, when the part-riding portion 166 is riding on the circular-arc shaped portion of the part 104, the ultrasonic beams 162 are normal or substantially normal to the surface of the part 104. When the interface plate 124 is removably attached to the probe body 122, the concentricity of the part inspection surface 128 and the ultrasonic array 150 allows each ultrasonic beam 162, generated by the plurality of ultrasound elements 152, to be normal or substantially normal to the part inspection surface 128 at an intersection of each ultrasonic beam 162 and the part inspection surface 128. Accordingly, when the inspection surface 128 is riding on a circular-arc shaped surface of the part 104, with the radius of the surface of the part 104 being substantially equal to the second radius r2 of the part inspection surface 128, each ultrasonic beam 162 is normal to the surface of the part 104 at an intersection of each ultrasonic beam 162 and the surface of the part 104. The ultrasonic beams 162 contacting and penetrating the part 104 at an angle normal to the surface of the part promotes accuracy, reliability, and an increase in the detectible range of anomalies within the part 104. As used herein, substantially normal means within 1.5 degrees of normal.

Figure 10:
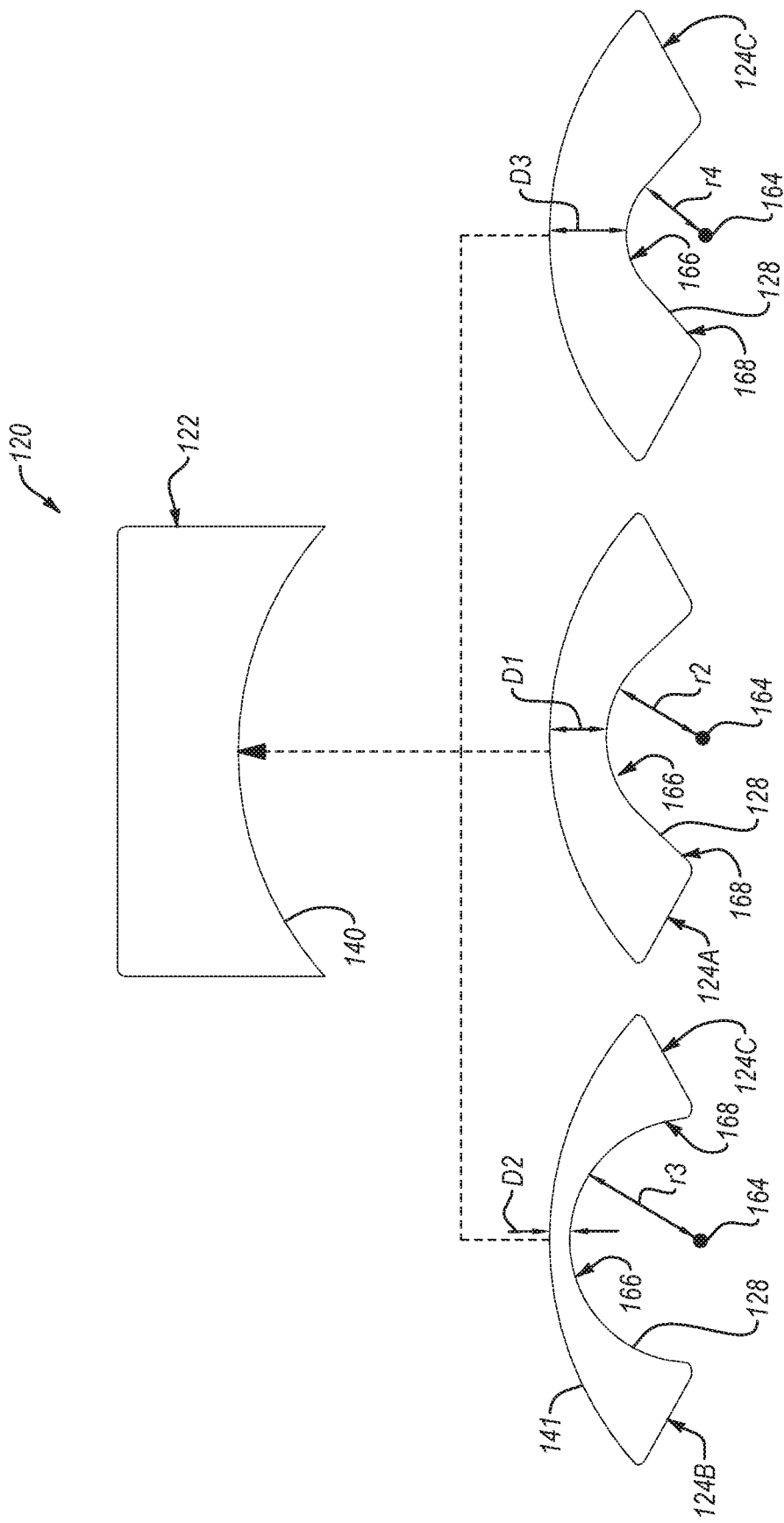
FIG. 10 is a front view of multiple interchangeable interface plates of an ultrasonic inspection probe, schematically shown as being interchangeably removably attachable to a probe body of the ultrasonic inspection probe, according to one or more examples of the present disclosure.

Referring now to FIG. 10, according to some examples, the ultrasonic inspection probe 120 includes the probe body 122 and a plurality of interface plates. The plurality of interface plates are interchangeably removably attachable to the probe body 122 to inspect differently-shaped parts 104. Each one of the plurality of interface plates includes the same general features as the interface plate 124 described above, with like numbers referring to like features. However, each one of the plurality of interface plates has a differently shaped part inspection surface 128 than any other of the plurality of interface plates to complement the shape of a corresponding one of the differently-shaped parts 104. For example, in the illustrated implementation, the ultrasonic inspection probe 120 includes a first interface plate 124A, a second interface plate 124B, and a third interface plate 124C. The circular-arc shaped part-riding portion 166 of the part inspection surface 128 of each one of the first interface plate 124A, the second interface plate 124B, and the third interface plate 124C are shaped to have the second radius r2, a third radius r3, and a fourth radius r4, respectively. The third radius r3 is greater than the second radius r2 and the fourth radius r4 is less than the second radius r2. The second radius r2 is substantially equal to the radius of a circular-arc shaped surface of a first one of the parts 104, the third radius r3 is substantially equal to the radius of a circular-arc shaped surface of a second one of the parts 104, and the fourth radius r4 is substantially equal to the radius of a circular-arc shaped surface of a second one of the parts 104. As used herein, a surface that is differently shaped relative to another surface can refer to differently sized surfaces with the same general shape (e.g., circular).

While the part inspection surfaces 128 of the first interface plate 124A, the second interface plate 124B, and the third interface plate 124C are differently shaped, the body attachment surfaces 141 of the first interface plate 124A, the second interface plate 124B, and the third interface plate 124C have the same shape. Accordingly, each of the first interface plate 124A, the second interface plate 124B, and the third interface plate 124C can be removably attached to and removed from the plate attachment surface 140 of the probe body 122 in the same manner, as described below with reference to the method 300. In this manner, the first interface plate 124A, the second interface plate 124B, and the third interface plate 124C are interchangeably removably attachable to the probe body 122.

When any one of the first interface plate 124A, the second interface plate 124B, and the third interface plate 124C is removably attached to the probe body 122, each ultrasonic beam 162 generated by the plurality of ultrasound elements 152 is normal to the part inspection surface 128 of the corresponding one of the first interface plate 124A, the second interface plate 124B, and the third interface plate 124C at an intersection of each ultrasonic beam 162 and the part inspection surface. Because the first radius r1 of the ultrasonic array 150 and the body attachment surfaces 141 of the first interface plate 124A, the second interface plate 124B, and the third interface plate 124C are fixed, and the second radius r2, the third radius r3, and the fourth radius r4 are different, to maintain concentricity between the part inspection surfaces 128 of the ultrasonic array 150 and the first interface plate 124A, the second interface plate 124B, and the third interface plate 124C when attached to the probe body 122, the distances between part inspection surfaces 128 and the body attachment surfaces 141 of the first interface plate 124A, the second interface plate 124B, and the third interface plate 124C are different. For example, the distance D1 between the top-center locations of the body attachment surface 141 and the part inspection surface 128 of the first interface plate 124A is more than the distance D2 between the top-center locations of the body attachment surface 141 and the part inspection surface 128 of the second interface plate 124B. Likewise, the distance D3 between the top-center locations of the body attachment surface 141 and the part inspection surface 128 of the third interface plate 124C is more than the distance D1 between the top-center locations of the body attachment surface 141 and the part inspection surface 128 of the first interface plate 124A.

Although, in the illustrated example, the ultrasonic inspection probe 120 includes three interchangeable interface plates, in other examples, the ultrasonic inspection probe 120 includes two or at least four interchangeable interface plates. The probe body 122 and the interface plate 124 can be made of any of various materials. For example, in certain implementations, either one or both of the probe body 122 and the interface plate 124 is made of a polymeric material. In certain examples, the interface plate 124 has a one-piece, monolithic, construction.

Referring now to FIGS. 13-19, according to alternative examples, an ultrasonic inspection probe 220 is shown. The ultrasonic inspection probe 220 is configured to provide features and functionality at least similar to the ultrasonic inspection probe 120 shown and described previously. Accordingly, unless otherwise indicated, like numbers between the ultrasonic inspection probe 120 and the ultrasonic inspection probe 220 refer to like features. The descriptions of the like features in the ultrasonic inspection probe 120 provided above apply to the like features in the ultrasonic inspection probe 220 unless otherwise noted. Like the ultrasonic inspection probe 120, the ultrasonic inspection probe 220 can form part of the end effector 110 of the ultrasonic inspection system 100 of FIG. 1. For example, the ultrasonic inspection probe 220 can be coupled to the robot 102 via the compliance interface assembly 112.

Figure 19:
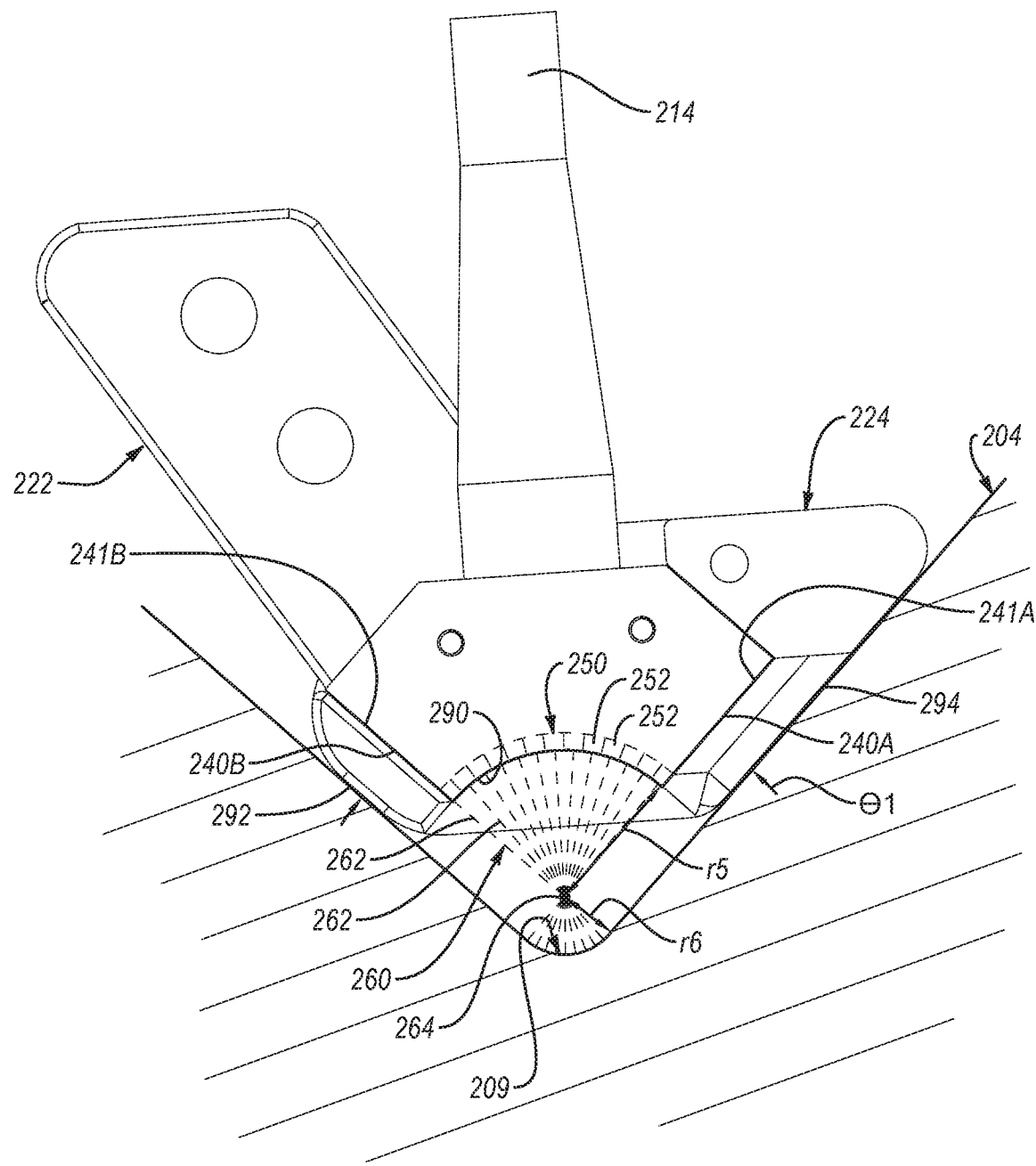
FIG. 19 is a side view of the ultrasonic inspection probe of FIG. 13, shown inspecting a part, according to one or more examples of the present disclosure.

In general, instead of being configured to inspect an externally radiused surface, like the ultrasonic inspection probe 120, the ultrasonic inspection probe 220 is configured to inspect a part 204 with an internally radiused surface, such as a flanged component. Referring to FIG. 19, in one example, the part 204 includes an internal or inside radius 209, which has a sixth radius r6 and can be inspected using the ultrasonic inspection probe 220 as shown.

Figure 13:
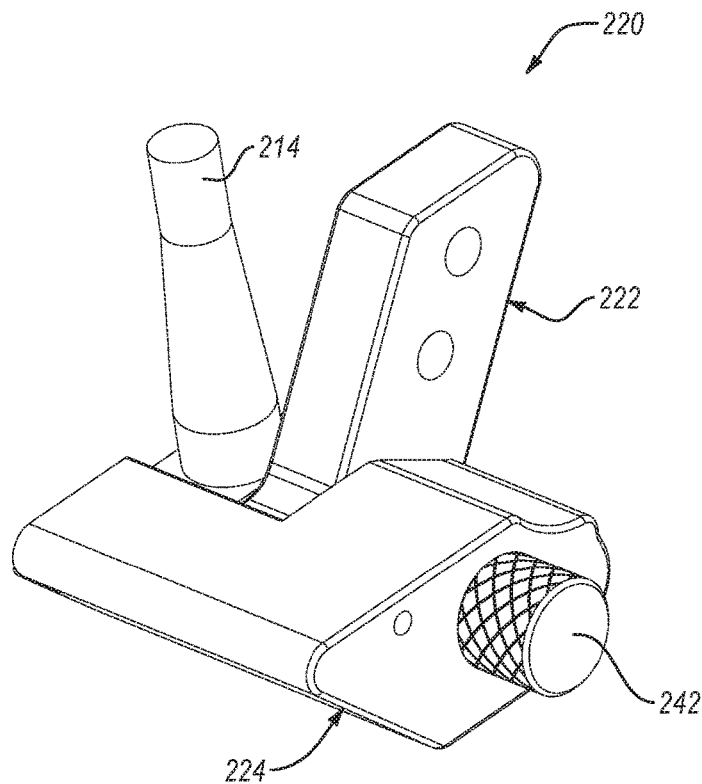
FIG. 13 is a first perspective view of an ultrasonic inspection probe, such as can be used with the ultrasonic inspection system of FIG. 1, according to one or more examples of the present disclosure.
Figure 14:
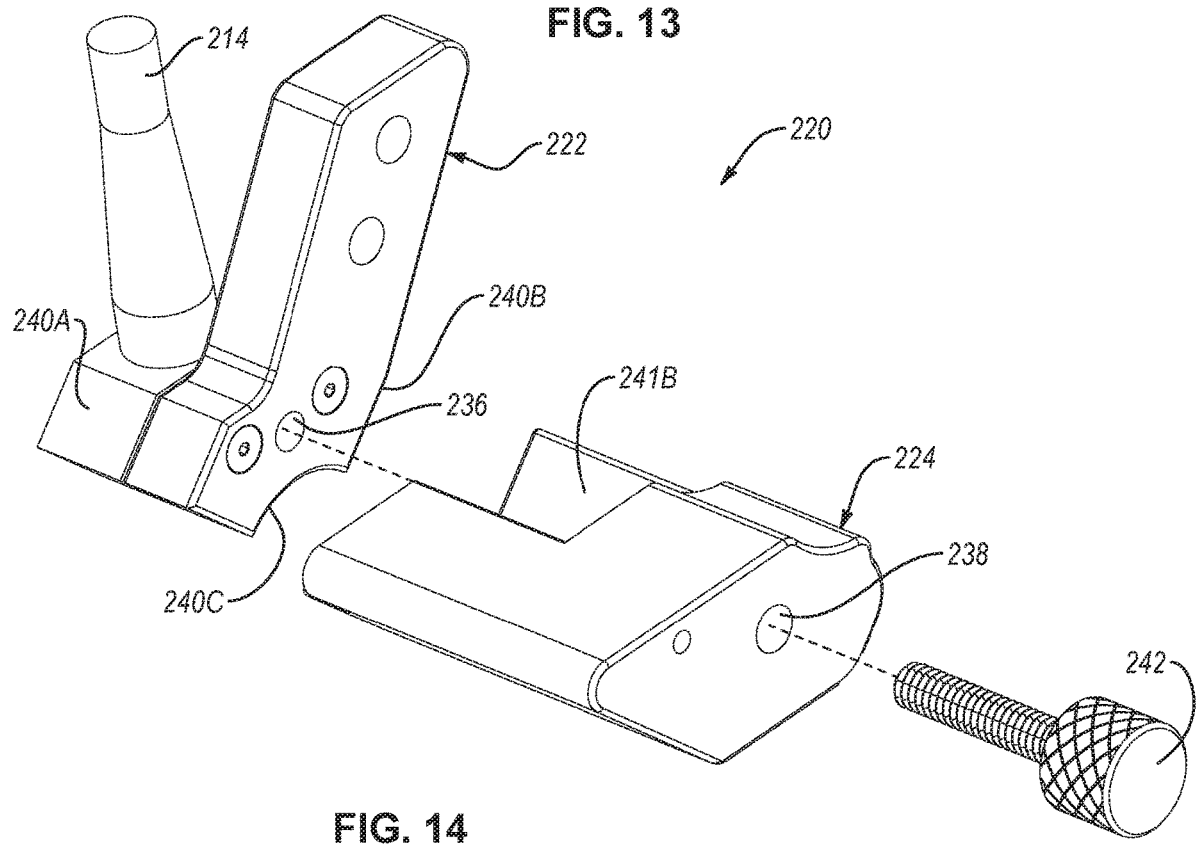
FIG. 14 is an exploded first perspective view of the ultrasonic inspection probe of FIG. 13, according to one or more examples of the present disclosure.
Figure 15:
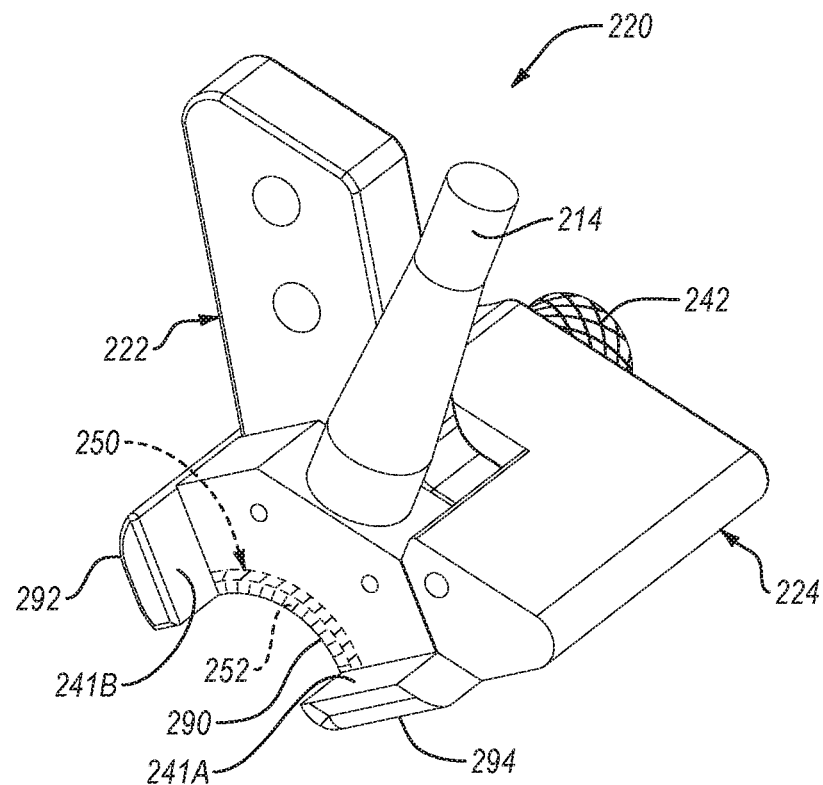
FIG. 15 is a second perspective view of the ultrasonic inspection probe of FIG. 13, according to one or more examples of the present disclosure.
Figure 16:
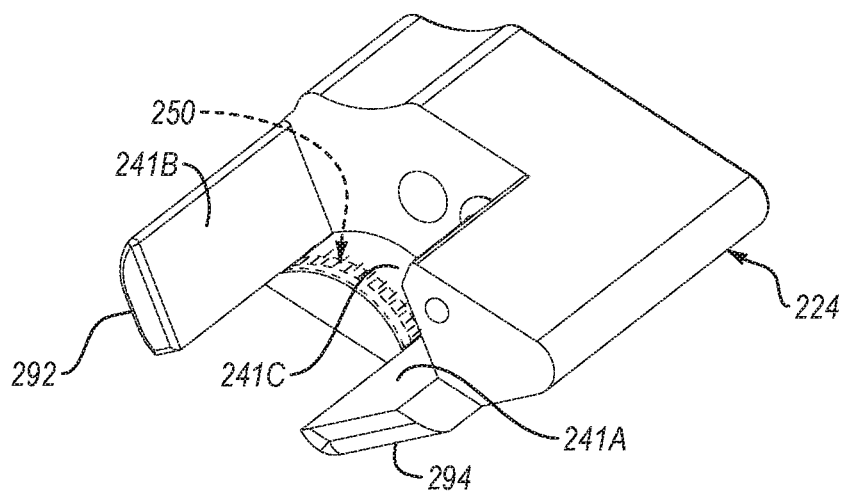
FIG. 16 is a perspective view of an interface plate of the ultrasonic inspection probe of FIG. 13, according to one or more examples of the present disclosure.
Figure 17:
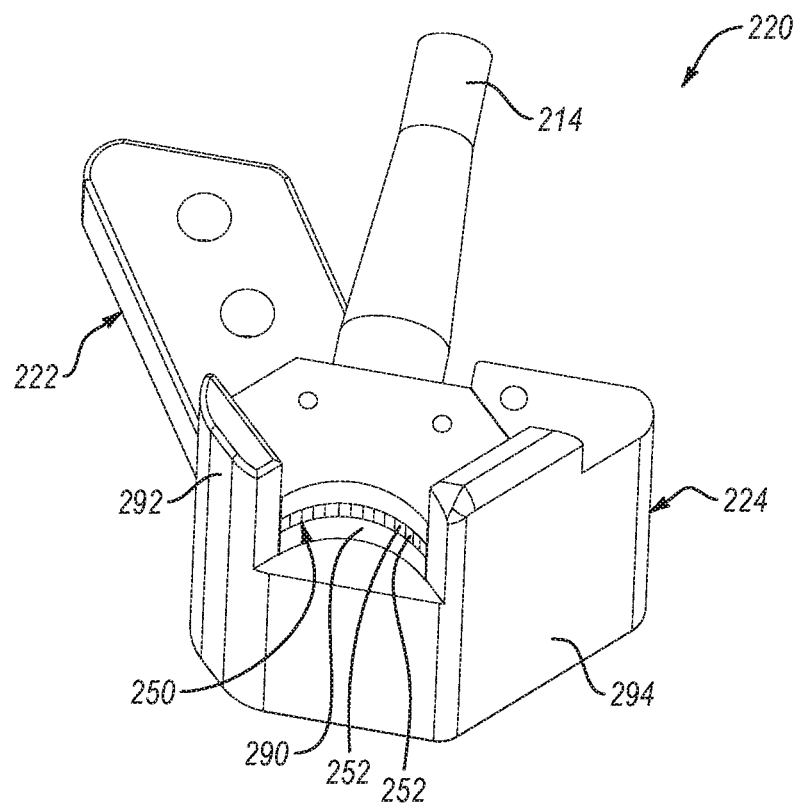
FIG. 17 is a third perspective view of the ultrasonic inspection probe of FIG. 13, according to one or more examples of the present disclosure.
Figure 18:
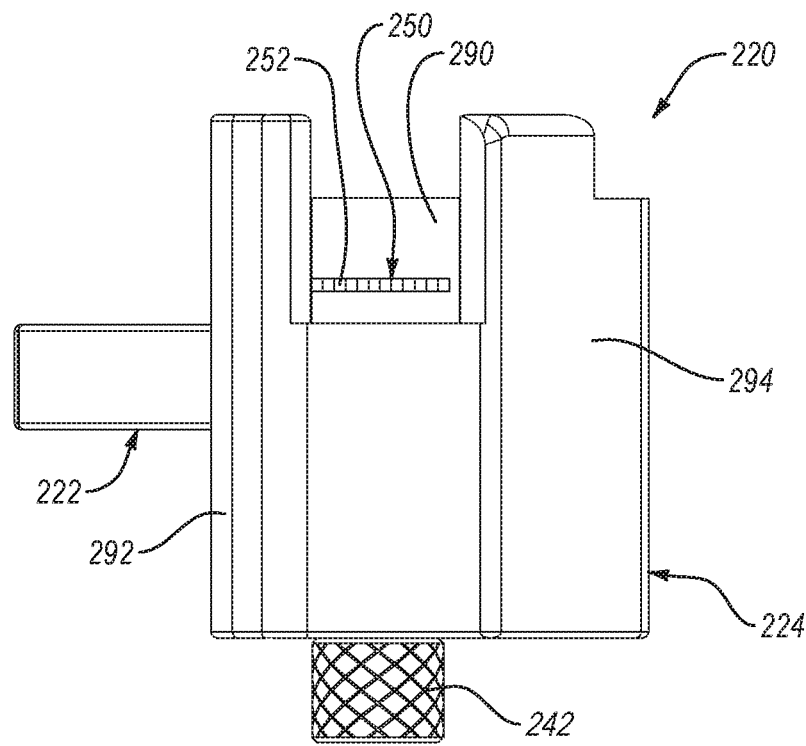
FIG. 18 is a bottom view of the ultrasonic inspection probe of FIG. 13, according to one or more examples of the present disclosure.

Referring to FIGS. 13 and 14, according to the illustrated examples, the ultrasonic inspection probe 220 includes a probe body 222 and an interface plate 224. The interface plate 224 is removably attachable to the probe body 222. In FIGS. 13, 15, and 17-19, the interface plate 224 is removably attached to the probe body 222, which can be directly attached to the compliance interface assembly 112 as described above. In the same manner at the ultrasonic inspection probe 120, for testing different parts each having a different shape, the ultrasonic inspection system 100 can utilize replacement of just the interface plate 224 rather than the entire ultrasonic inspection probe 220 or the entire end effector 110.

The probe body 222 includes a first plate attachment surface 240A, a second plate attachment surface 240B, and a third plate attachment surface 240C. The first plate attachment surface 240A and the second plate attachment surface 240B are spaced apart from each other and the third plate attachment surface 240C is interposed between the first plate attachment surface 240A and the second plate attachment surface 240B. Correspondingly, the interface plate 224 includes a first body attachment surface 241A, a second body attachment surface 241B, and a third body attachment surface 241C (see, e.g., FIGS. 14-16). The first body attachment surface 241A is removably attachable to the first plate attachment surface 240A, the second body attachment surface 241B is removably attachable to the second plate attachment surface 240B, and the third body attachment surface 241C is removably attachable to the third plate attachment surface 240C. In other words, the first body attachment surface 241A and the first plate attachment surface 240A are configured to mate with each other, the second body attachment surface 241B and the second plate attachment surface 240B are configured to mate with each other, and the third body attachment surface 241C and the third plate attachment surface 240C are configured to mate with each other. Accordingly, a shape of the first plate attachment surface 240A complements the shape of the first body attachment surface 241A, a shape of the second plate attachment surface 240B complements the shape of the second body attachment surface 241B, and a shape of the third plate attachment surface 240C complements the shape of the third body attachment surface 241C.

In one example, the first body attachment surface 241A and the second body attachment surface 241B of the interface plate 224 are flat surfaces configured to seat flush against flat surfaces of the first plate attachment surface 240A and the second plate attachment surface 240B, respectively. The first body attachment surface 241A and the second body attachment surface 241B are angled relative to each other. Correspondingly, the first plate attachment surface 240A and the second plate attachment surface 240B are angled relative to each other. The angled surfaces help to secure and support the interface plate 224 in a proper position relative to the probe body 222. The third body attachment surface 241C and the third plate attachment surface 240C are curved (e.g., non-flat) in some examples to facilitate nestable engagement between the third body attachment surface 241C and the third plate attachment surface 240C. The attachment surfaces of the ultrasonic inspection probe 220 can have shapes, other than those described above, in alternative examples.

Removable attachment of the first plate attachment surface 240A, the second plate attachment surface 240B, and the third plate attachment surface 240C to the first body attachment surface 241A, the second body attachment surface 241B, and the third body attachment surface 241C is facilitated by at least one fastener 242 in some examples. As shown in FIGS. 13 and 14, in one example, the ultrasonic inspection probe 220 includes a single fastener 242 (i.e., only one fastener). The fastener 242 is configured to extend through aligned holes in the probe body 222 and the interface plate 224. More specifically, in the illustrated example, the probe body 222 includes a hole 236 and the interface plate 224 includes a holes 238 extending entirely through the interface plate 224. Either the hole 236 or the hole 238 includes internal threads for engaging external threads of the fastener 242.

When the plate attachment surfaces of the probe body 222 are mated to the corresponding body attachment surfaces of the interface plate 224, the hole 236 in the probe body 222 is aligned with the hole 238 in the interface plate 224. When aligned, the fastener 242 is extendable into the aligned holes to engage the threads of the threaded hole. In the illustrated example, the hole 236 of the probe body 222 include threads to engage the threads of the fastener 242 after the fastener passes through the hole 238 of the interface plate 224. Threadable engagement between the fastener 242 and the threads of the hole 236 allow the fastener 242 to be tightened to attach the interface plate 224 to the probe body 222 or be loosened to remove the interface plate 224 from the probe body 222. Although a fastener is utilized in the illustrated example, in other examples, other coupling devices, such as a quick-release, a resilient clip/tab, an interference-fitted component, etc., that facilitate removable attachment of the interface plate 224 to the probe body 222 can be used.

The probe body 222 includes and houses an ultrasonic array 250 (see, e.g., FIGS. 15-19). The ultrasonic array 250 is non-movably fixed to the probe body 222 and includes a plurality of ultrasound elements 252. The ultrasonic array 250 is configured and operable in the same manner as the ultrasonic array 150. Similar to the ultrasonic array 150, the ultrasound elements 252 of the ultrasonic array 250 are arranged into a circular arc having a fifth radius r5 such that ultrasonic beams 262, generated by the ultrasonic array 250, pass through a center 264 of the circular arc defined by the ultrasonic array 250. In other words, every ultrasonic beam 262 generated by the ultrasonic array 250 passes through the center 264 of the circular arc defined by the ultrasonic array 250. The collection of ultrasonic beams 262 generated by the ultrasound elements 252 of the ultrasonic array 250 define an ultrasonic field 260.

In an example, the probe body 222 includes a body internal cavity formed in an array receiving surface 290 of the probe body 222. The ultrasonic array 250 is fixed within the body internal cavity, which can be shaped to fit the ultrasonic array 250 therein. The body internal cavity can be open at the array receiving surface 290.

The probe body 222 additionally includes an aperture open to the body internal cavity. This aperture allows a power-communications line 214 to be coupled to the ultrasonic array 250. The power-communications line 214 extends through the aperture from a location external to the probe body 222 (e.g., at a controller of the ultrasonic inspection system 100), through the aperture, and into power and/or communications coupling engagement with the ultrasonic array 250.

As shown in FIGS. 15-19, the interface plate 224 further includes a first part inspection surface 292 and a second part inspection surface 294. The first part inspection surface 292 and the second part inspection surface 294 are configured to engage (e.g., ride on) respective surfaces of the part 204. Accordingly, the shape of the first part inspection surface 292 and the second part inspection surface 294 correspond with the shape of the surfaces of the part 204. In the illustrated example, at least a portion of both of the first part inspection surface 292 and the second part inspection surface 294 are flat to engage corresponding flat surfaces of the part 204.

The first part inspection surface 292 and the second part inspection surface 294 are spaced apart from each other, which allows the ultrasonic array 250 to be interposed between the first part inspection surface 292 and the second part inspection surface 294. As shown in FIG. 19, the first part inspection surface 292 and the second part inspection surface 294 are angled relative to each other such that a first angle θ1 is defined between the first part inspection surface 292 and the second part inspection surface 294. The first angle θ1 corresponds (e.g., is the same as) an angle defined between the two surfaces of the part 204 that converge to define the inside radius 209. In the illustrated example, the first angle θ1 is about 90-degrees. The first part inspection surface 292 and the second part inspection surface 294 engage a respective one of the surfaces of the part 204 that converge to define the inside radius 209.

The first part inspection surface 292 and the second part inspection surface 294 are further configured to align the center 264 of the ultrasonic array 250 with a center of the inside radius 209 when the first part inspection surface 292 and the second part inspection surface 294 engage the respective surfaces of the part 204. In other words, when the first part inspection surface 292 and the second part inspection surface 294 engage the respective surfaces of the part 204, the inside radius 209 of the part 204 is concentric with the circular arc defined by the plurality of ultrasound elements 252 of the ultrasonic array 250. Accordingly, the size, shape, and/or relative first angle θ1 of the first part inspection surface 292 and the second part inspection surface 294 is dependent on the size, shape, and/or relative angle of the respective surfaces of the part 204, as well as the radius of the inside radius 209 of the part. As shown in FIG. 19, the inside radius 209 has a sixth radius r6 with a center common with the center 264 of the circular arc of the ultrasonic array 250 when the first part inspection surface 292 and the second part inspection surface 294 are properly engaged with the part 204. Because the first part inspection surface 292 and the second part inspection surface 294 ensure the ultrasonic array 250 and the inside radius 209 are concentric with each other, they also ensure the ultrasonic beams 262 generated by the ultrasonic array 250 pass through the shared center 264 and thus are normal to the surface of the inside radius 209 of the part 204.

Figure 20:
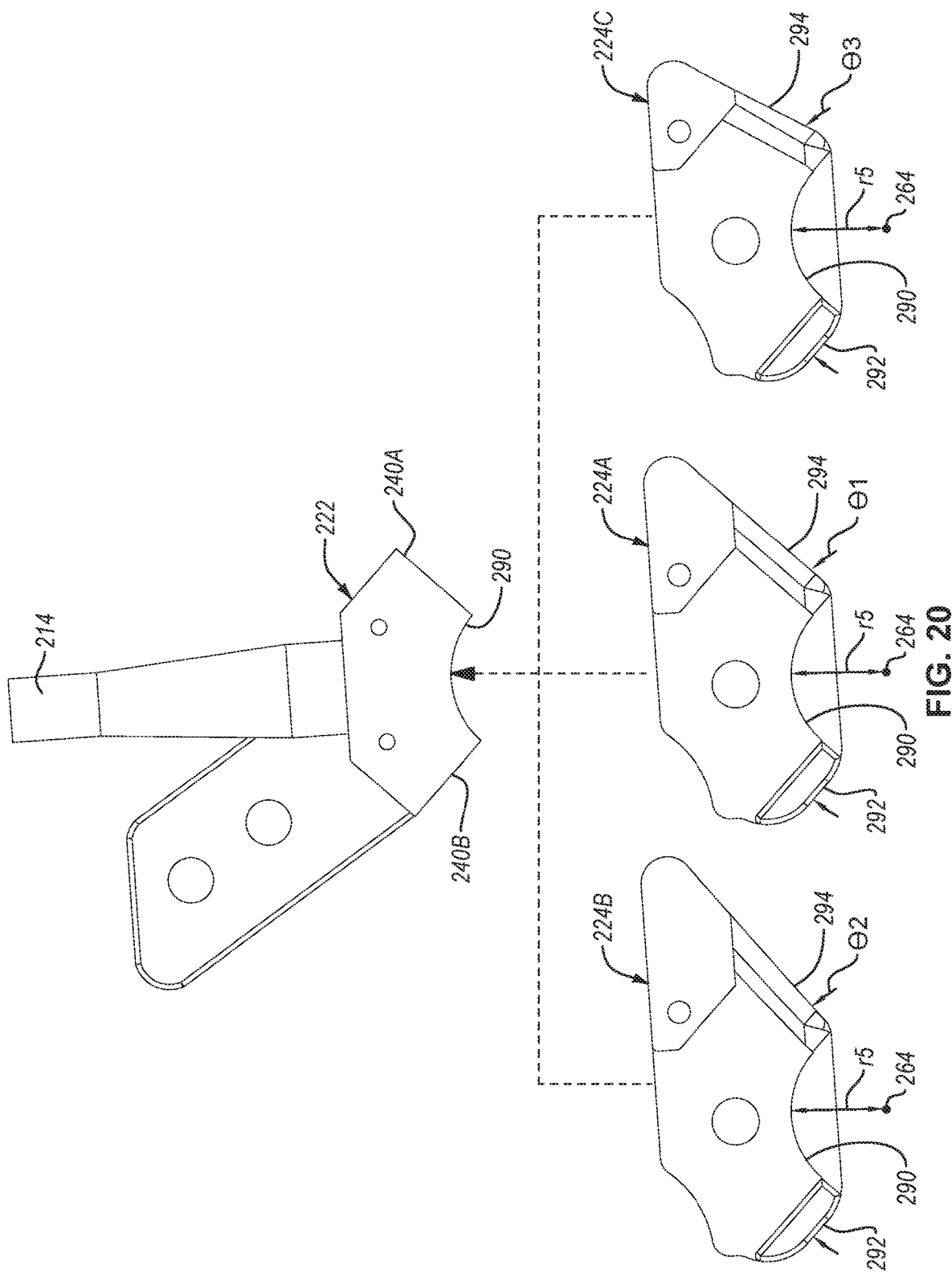
FIG. 20 is a side view of multiple interchangeable interface plates of an ultrasonic inspection probe, schematically shown as being interchangeably removably attachable to a probe body of the ultrasonic inspection probe, according to one or more examples of the present disclosure.

Referring now to FIG. 20, according to some examples, the ultrasonic inspection probe 220 includes the probe body 222 and a plurality of interface plates. The plurality of interface plates are interchangeably removably attachable to the probe body 222 to inspect differently-shaped parts 104 (e.g., differently sized inside radii). Each one of the plurality of interface plates includes the same general features as the interface plate 224 described above, with like numbers referring to like features. However, each one of the plurality of interface plates has a differently configured first part inspection surface 292 and second part inspection surface 294 than any other of the plurality of interface plates to complement a shape of a corresponding one of the differently-shaped parts 204. For example, in the illustrated implementation, the ultrasonic inspection probe 220 includes a first interface plate 224A, a second interface plate 224B, and a third interface plate 224C. The first part inspection surfaces 292 and the second part inspection surfaces 294 of each one of the first interface plate 224A, the second interface plate 224B, and the third interface plate 224C are configured to define, between the surfaces, a first angle θ1, a second angle θ2, and a third angle θ2, respectively. The second angle θ2 is greater than the first angle θ1 and the third angle θ3 is less than the first angle θ1, but the radius r5 of the ultrasonic array 150 is the same. According to some examples, the sixth radius r6 of the inside radius 209 of the part 204 for which the first interface plate 224A is configured to inspect can be smaller than the sixth radius r6 of the inside radius 209 of the part 204 for which the second interface plate 224B is configured to inspect. Likewise, in the same examples, the sixth radius r6 of the inside radius 209 of the part 204 for which the first interface plate 224A is configured to inspect can be greater than the sixth radius r6 of the inside radius 209 of the part 204 for which the third interface plate 224C is configured to inspect.

While the first part inspection surfaces 292 and the second part inspection surfaces 294 of the first interface plate 224A, the second interface plate 224B, and the third interface plate 224C are differently shaped, the first body attachment surfaces 241A, the second body attachment surfaces 241B, and the third body attachment surfaces 241C of the first interface plate 224A, the second interface plate 224B, and the third interface plate 224C have the same shape. Accordingly, each of the first interface plate 224A, the second interface plate 224B, and the third interface plate 224C can be removably attached to and removed from the probe body 222 in the same manner, as described below with reference to the method 300. In this manner, the first interface plate 224A, the second interface plate 224B, and the third interface plate 224C are interchangeably removably attachable to the probe body 222.

Although, in the illustrated example, the ultrasonic inspection probe 220 includes three interchangeable interface plates, in other examples, the ultrasonic inspection probe 220 includes two or at least four interchangeable interface plates. The probe body 222 and the interface plate 224 can be made of any of various materials. For example, in certain implementations, either one or both of the probe body 222 and the interface plate 224 is made of a polymeric material. In certain examples, the interface plate 224 has a one-piece, monolithic, construction.

Figure 21:
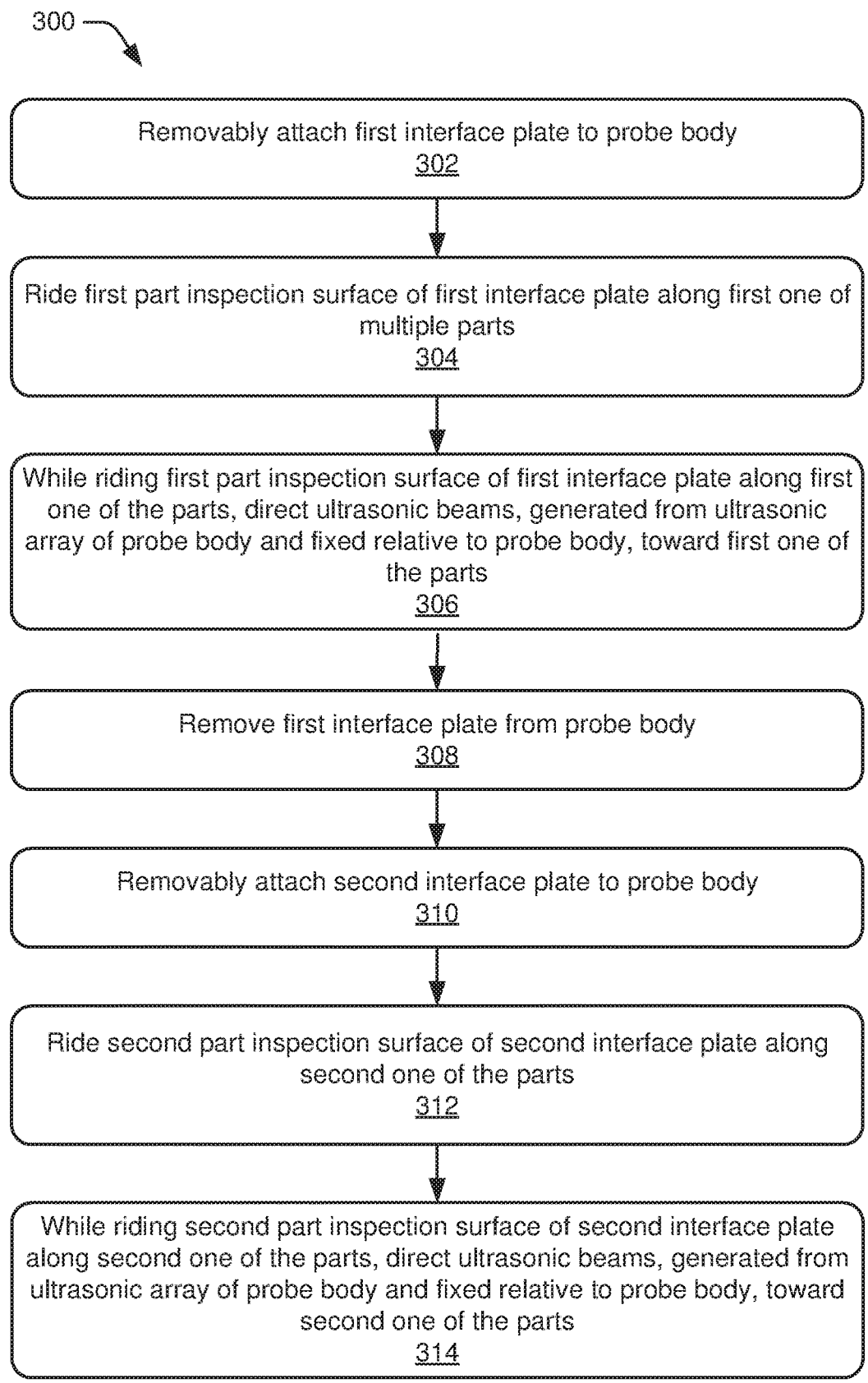
FIG. 21 is a schematic flow diagram of a method of inspecting parts, according to one or more examples of the present disclosure.

As shown in FIG. 21, according to certain examples, the method 300 of inspecting parts, such as parts each having a differently-shaped surface to be inspected, includes (block 302) removably attaching a first interface plate 124A to a probe body 122. The method 300 also includes (block 304) riding a first part inspection surface 128 of the first interface plate 124A along a first one of the parts 104. The method 300 additionally includes (block 306) directing ultrasonic beams 162, generated from an ultrasonic array 150 of the probe body 122 and fixed relative to the probe body 122, toward the first one of the parts while riding the first part inspection surface 128 of the first interface plate 124A along the first one of the parts 104.

In some examples of the method 300, the method 300 further includes (block 308) removing the first interface plate 124A from the probe body 122 and (block 310) removably attaching a second interface plate 124B to the probe body 122 in place of the first interface plate 124A. The method 300 also includes (block 312) riding a second part inspection surface 128 of the second interface plate 124B along a second one of the parts 104. The method 300 additionally includes (block 314) directing ultrasonic beams 162, generated from the ultrasonic array 150 of the probe body 122, toward the second one of the parts 104 while riding the second part inspection surface 128 of the second interface plate 124B along the second one of the parts 104.

According to some examples, the method 300 is executed using the ultrasonic inspection system 100, including the robot 102 and the end effector 110. For example, the robot 102 can be selectively operable to move a probe body relative to parts to ride part inspection surfaces of interface plates, removably attached to the probe body, along surfaces of the parts to inspect the parts. Also not shown, the ultrasonic inspection system 100 additionally includes a plate exchange system that stores multiple interface plates and facilitates removal of one interface plate from the probe body to the plate exchange system and removable attachment of another interface plate to the probe body from the plate exchange system. Some or part of the method 300 of inspecting parts is fully automated. For example, the robot 102 can be operable to remove interface plates from and attach interface plates to the probe body, using the plate exchange system, in an autonomous manner. In one example, the interface plates are attached to and removed from the probe body by tightening and loosening, respectively, one or more fasteners, which can be performed autonomously using the robot 102 and the plate exchange system.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification.

For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An ultrasonic inspection probe for inspecting parts, the ultrasonic inspection probe comprising:
    a probe body, comprising an ultrasonic array and a plate attachment surface, wherein the ultrasonic array comprises a plurality of ultrasound elements, each selectively operable to generate an ultrasonic beam and each fixed relative to the plate attachment surface, wherein the plurality of ultrasound elements of the ultrasonic array is arranged in a first circular arc having a first radius, and wherein the ultrasonic array is fixed relative to the probe body such that the ultrasonic array does not move relative to the probe body; and
    an interface plate, comprising a body attachment surface, removably attachable to the plate attachment surface of the probe body, a part inspection surface, shaped to complement a shape of one of the parts, and an opening extending entirely through the interface plate from the body attachment surface to the part inspection surface, wherein the ultrasonic beams are directed through the opening in the interface plate without being redirected by the interface plate.

2. The ultrasonic inspection probe according to claim 1, wherein, when the body attachment surface of the interface plate is removably attached to the plate attachment surface of the probe body, each ultrasonic beam generated by the plurality of ultrasound elements is substantially normal to the part inspection surface at an intersection of each ultrasonic beam and the part inspection surface.

3. The ultrasonic inspection probe according to claim 1, wherein:
    the part inspection surface defines a second circular arc having a second radius;
    the second radius is smaller than the first radius; and
    the first circular arc and the second circular arc are substantially concentric when the body attachment surface of the interface plate is removably attached to the plate attachment surface of the probe body.

4. The ultrasonic inspection probe according to claim 1, wherein the interface plate is removably attached to the probe body by at least one fastener.

5. The ultrasonic inspection probe according to claim 1, wherein:
the probe body further comprises a first fluid supply line;
the interface plate further comprises a second fluid supply line;
the second fluid supply line is fluidly coupleable with the first fluid supply line when the body attachment surface of the interface plate is removably attached to the plate attachment surface of the probe body;
the opening of the interface plate is a fluid reservoir pocket; and
the second fluid supply line is fluidly coupleable with the fluid reservoir pocket.

6. The ultrasonic inspection probe according to claim 5, wherein:
the interface plate further comprises a plurality of second fluid supply lines;
each one of the plurality of second fluid supply lines is fluidly coupleable with the first fluid supply line when the body attachment surface of the interface plate is removably attached to the plate attachment surface of the probe body; and
each one of the plurality of second fluid supply lines is fluidly coupleable with the fluid reservoir pocket.

7. The ultrasonic inspection probe according to claim 1, wherein:
the interface plate comprises at least two part inspection surfaces, spaced apart from each other; and
the ultrasonic array is interposed between the at least two part inspection surfaces.

8. The ultrasonic inspection probe according to claim 7, wherein:
the shape of one of the parts comprises an inside radius; and
the at least two part inspection surfaces are configured such that, when the at least two part inspection surfaces engage the one of the parts, the inside radius is substantially concentric with the first circular arc of the plurality of ultrasound elements.

9. The ultrasonic inspection probe according to claim 1, wherein:
the probe body further comprises at least two plate attachment surfaces, spaced apart from each other;
the interface plate further comprises at least two body attachment surfaces, spaced apart from each other; and
each one of the at least two body attachment surfaces of the interface plate is removably attachable to a corresponding one of the at least two plate attachment surfaces of the probe body.

10. The ultrasonic inspection probe according to claim 9, wherein the interface plate is removably attached to the probe body by only one fastener.

11. The ultrasonic inspection probe according to claim 1, wherein the part inspection surface of the interface plate is non-adjustable.

12. The ultrasonic inspection probe according to claim 1, further comprising a plurality of interface plates, wherein:
each one of the parts is shaped differently than any other one of the parts;
the plurality of interface plates is interchangeably removably attachable to the probe body; and
the part inspection surface of each one of the plurality of interface plates is shaped differently than the part inspection surface of any other one of the plurality of interface plates to complement the shape of a corresponding one of the parts.

13. The ultrasonic inspection probe according to claim 12, wherein:
the part inspection surface of each one of the plurality of interface plates defines a second circular arc;
a second radius of the second circular arc of the part inspection surface of each one of the plurality of interface plates is smaller than the first radius and is different than the second radius of the second circular arc of the part inspection surface of any other one of the plurality of interface plates; and
the first circular arc and the second circular arc of the part inspection surface of any one of the plurality of interface plates when the body attachment surface of the corresponding one of the plurality of interface plates is removably attached to the plate attachment surface of the probe body.

14. The ultrasonic inspection probe according to claim 13, wherein, when the body attachment surface of any one of the plurality of interface plates is removably attached to the plate attachment surface of the probe body, each ultrasonic beam generated by the plurality of ultrasound elements is substantially normal to the part inspection surface of the corresponding one of the plurality of interface plates at an intersection of each ultrasonic beam and the part inspection surface.

15. The ultrasonic inspection probe according to claim 12, wherein:
each one of the plurality of interface plates comprises at least two part inspection surfaces, spaced apart from each other;
each one of the parts comprises an inside radius and is shaped differently than any other of the parts;
when the at least two part inspection surfaces of any one of the plurality of interface plates, when removably attached to the probe body, engage a corresponding one of the parts, the inside radius of the corresponding one of the parts is substantially concentric with the first circular arc of the plurality of ultrasound elements; and
the at least two part inspection surfaces of any one of the plurality of interface plates is configured differently than the at least two inspection surfaces of any other one of the plurality of interface plates.

16. An ultrasonic inspection system for inspecting parts, the ultrasonic inspection system comprising:
a robot; and
an end effector, coupled to and movable by the robot, wherein the end effector comprises:
a compliance interface assembly, directly coupled to the robot; and
an ultrasonic inspection probe, coupled to the compliance interface assembly such that the compliance interface assembly couples the ultrasonic inspection probe to the robot, wherein the ultrasonic inspection probe comprises:
a probe body, comprising an ultrasonic array and a plate attachment surface, wherein the ultrasonic array comprises a plurality of ultrasound elements, each selectively operable to generate an ultrasonic beam and each fixed relative to the plate attachment surface, wherein the plurality of ultrasound elements of the ultrasonic array is arranged in a first circular arc having a first radius, and wherein the ultrasonic array is fixed relative to the probe body such that the ultrasonic array does not move relative to the probe body; and an interface plate, comprising a body attachment surface, removably attachable to the plate attachment surface of the probe body, a part inspection surface, shaped to complement a shape of one of the parts, and an opening extending entirely through the interface plate from the body attachment surface to the part inspection surface, wherein the ultrasonic beams are directed through the opening in the interface plate without being redirected by the interface plate.

17. A method of inspecting parts, the method comprising: removably attaching a first interface plate to a probe body, wherein:

the probe body comprises an ultrasonic array and a plate attachment surface, wherein the ultrasonic array comprises a plurality of ultrasound elements, each selectively operable to generate an ultrasonic beam and each fixed relative to the plate attachment surface, wherein the plurality of ultrasound elements of the ultrasonic array is arranged in a first circular arc having a first radius, and wherein the ultrasonic array is fixed relative to the probe body such that the ultrasonic array does not move relative to the probe body; and the first interface plate comprises a body attachment surface, removably attachable to the plate attachment surface of the probe body, a first part inspection surface, shaped to complement a shape of one of the parts, and an opening extending entirely through the first interface plate from the body attachment surface to the part inspection surface;

riding the first part inspection surface of the first interface plate along a first one of the parts; and while riding the part inspection surface of the first interface plate along the first one of the parts, directing ultrasonic beams, generated from the ultrasonic array of the probe body, toward the first one of the parts and through the opening in the first interface plate without being redirected by the first interface plate.

18. The method according to claim 17, further comprising:

removing the first interface plate from the probe body;

removably attaching a second interface plate to the probe body in place of the first interface plate;

riding a second part inspection surface of the second interface plate along a second one of the parts, wherein the second one of the parts is shaped differently than the first one of the parts; and while riding the part inspection surface of the second interface plate along the second one of the parts, directing ultrasonic beams, generated from the ultrasonic array of the probe body, toward the second one of the parts.

19. The method according to claim 18, wherein:

the step of removably attaching the first interface plate to the probe body comprises tightening at least one fastener;

the step of removing the first interface plate from the probe body comprises loosening the at least one fastener; and the step of removably attaching the second interface plate to the probe body in place of the first interface plate comprises tightening the at least one fastener.

20. The ultrasonic inspection probe according to claim 12, wherein a minimum distance between the part inspection surface, of a first one of the plurality of interface plates, and the plate attachment surface of the probe body, when the first one of the plurality of interface plates is attached to the probe body, is different than a minimum distance between the part inspection surface, of a second one of the plurality of interface plates, and the plate attachment surface of the probe body, when the second one of the plurality of interface plates is attached to the probe body.

\* \* \* \* \*